United States Patent
Ogawara

(10) Patent No.: US 10,474,414 B2
(45) Date of Patent: Nov. 12, 2019

(54) IMAGE DISPLAY SYSTEM, INFORMATION PROCESSING APPARATUS, AND IMAGE DISPLAY METHOD

(71) Applicant: Ricoh Company, Ltd., Tokyo (JP)

(72) Inventor: Osamu Ogawara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 78 days.

(21) Appl. No.: 15/229,887

(22) Filed: Aug. 5, 2016

(65) Prior Publication Data

US 2017/0052752 A1    Feb. 23, 2017

(30) Foreign Application Priority Data

Aug. 17, 2015  (JP) .................................. 2015-160513

(51) Int. Cl.
  *G06F 3/14* (2006.01)
  *H04N 9/31* (2006.01)
(52) U.S. Cl.
  CPC .......... *G06F 3/1431* (2013.01); *G06F 3/1446* (2013.01); *H04N 9/3147* (2013.01);
  (Continued)
(58) Field of Classification Search
  CPC ... G06F 3/1431; G06F 3/1446; H04N 9/3147; G09G 2340/0485; G09G 2354/00; G09G 2356/00
  (Continued)

(56) References Cited

U.S. PATENT DOCUMENTS 5,023,725 A * 6/1991 McCutchen .......... G03B 37/04
  348/264
6,309,072 B1 10/2001 Deter
(Continued)

FOREIGN PATENT DOCUMENTS

GB    1190983 A    5/1970
JP    2003-524927 A    8/2003
(Continued)

OTHER PUBLICATIONS

International Search Report and Written Opinion dated Oct. 26, 2016 in PCT/JP2016/003713 filed on Aug. 10, 2016. 14 pages.
(Continued)

*Primary Examiner* — Jennifer Mehmood
*Assistant Examiner* — Ngan T Pham Lu
(74) *Attorney, Agent, or Firm* — Xsensus LLP

(57) ABSTRACT

An image display system includes at least one display device and at least one information processing apparatus connected to the display device. The information processing apparatus includes an input unit which receives a plurality of image data items and parameters related to a display image, a determination unit which determines areas of an image indicated by the image data items, which areas are displayed by the display device as partial images of the display image, based on the parameters, a setting unit which sets up a switching condition for switching the image data items, a switching unit which switches the image data items when the switching condition is met, and a transmission unit which transmits data indicating the areas to the display device. The display device is configured to display the areas determined by the determination unit at intervals of a predetermined time.

20 Claims, 21 Drawing Sheets

(52) U.S. Cl.
CPC .  *G09G 2340/0485* (2013.01); *G09G 2354/00* (2013.01); *G09G 2356/00* (2013.01)

(58) Field of Classification Search
USPC .......................................................... 345/1.3
See application file for complete search history.

(56) References Cited

U.S. PATENT DOCUMENTS

| | | | |
|---|---|---|---|
| 7,477,284 | B2 | 1/2009 | Peleg et al. |
| 9,392,167 | B2 | 7/2016 | Shohara et al. |
| 9,607,358 | B2 | 3/2017 | Takenaka et al. |
| 2004/0207618 | A1 | 10/2004 | Williams et al. |
| 2008/0024664 | A1 | 1/2008 | Kimura |
| 2009/0322740 | A1 | 12/2009 | Carlson |
| 2010/0001997 | A1 | 1/2010 | Kajikawa et al. |
| 2012/0147003 | A1* | 6/2012 | Liu ...................... G02B 5/0252 345/419 |
| 2013/0181901 | A1 | 7/2013 | West |
| 2014/0176542 | A1* | 6/2014 | Shohara ................ G06T 15/205 345/420 |
| 2014/0298180 | A1* | 10/2014 | Tashiro .................. H04N 5/783 715/730 |
| 2015/0046810 | A1 | 2/2015 | Ogawara |
| 2015/0062363 | A1* | 3/2015 | Takenaka ........... H04N 5/23238 348/218.1 |
| 2015/0070249 | A1 | 3/2015 | Hashikami et al. |

FOREIGN PATENT DOCUMENTS

| | | |
|---|---|---|
| JP | 2005-031270 A | 2/2005 |
| JP | 2008-033138 | 2/2008 |
| JP | 2012-18237 A | 1/2012 |
| JP | 2012-178097 A | 9/2012 |
| JP | 2013-003327 | 1/2013 |
| JP | 2013-214947 A | 10/2013 |
| JP | 2013-250470 A | 12/2013 |
| JP | 2013-251787 A | 12/2013 |
| JP | 2014-72608 A | 4/2014 |
| JP | 2014-127001 | 7/2014 |
| JP | 2015-055827 | 3/2015 |

OTHER PUBLICATIONS

Office Action issued in corresponding U.S. Appl. No. 15/743,423 dated Sep. 19, 2018, 14 pages.

Office Action dated Apr. 2, 2019 in Japanese Patent Application No. 2015-160512.

Office Action dated Apr. 2, 2019 in Japanese Patent Application No. 2015-160513.

Japanese Office Action dated Aug. 6, 2019, issued in corresponding Japanese Application No. 2015-160512, 1 pages.

Japanese Office Action dated Aug. 6, 2019, issued in corresponding Japanese Application No. 2015-160513, 2 pages.

* cited by examiner

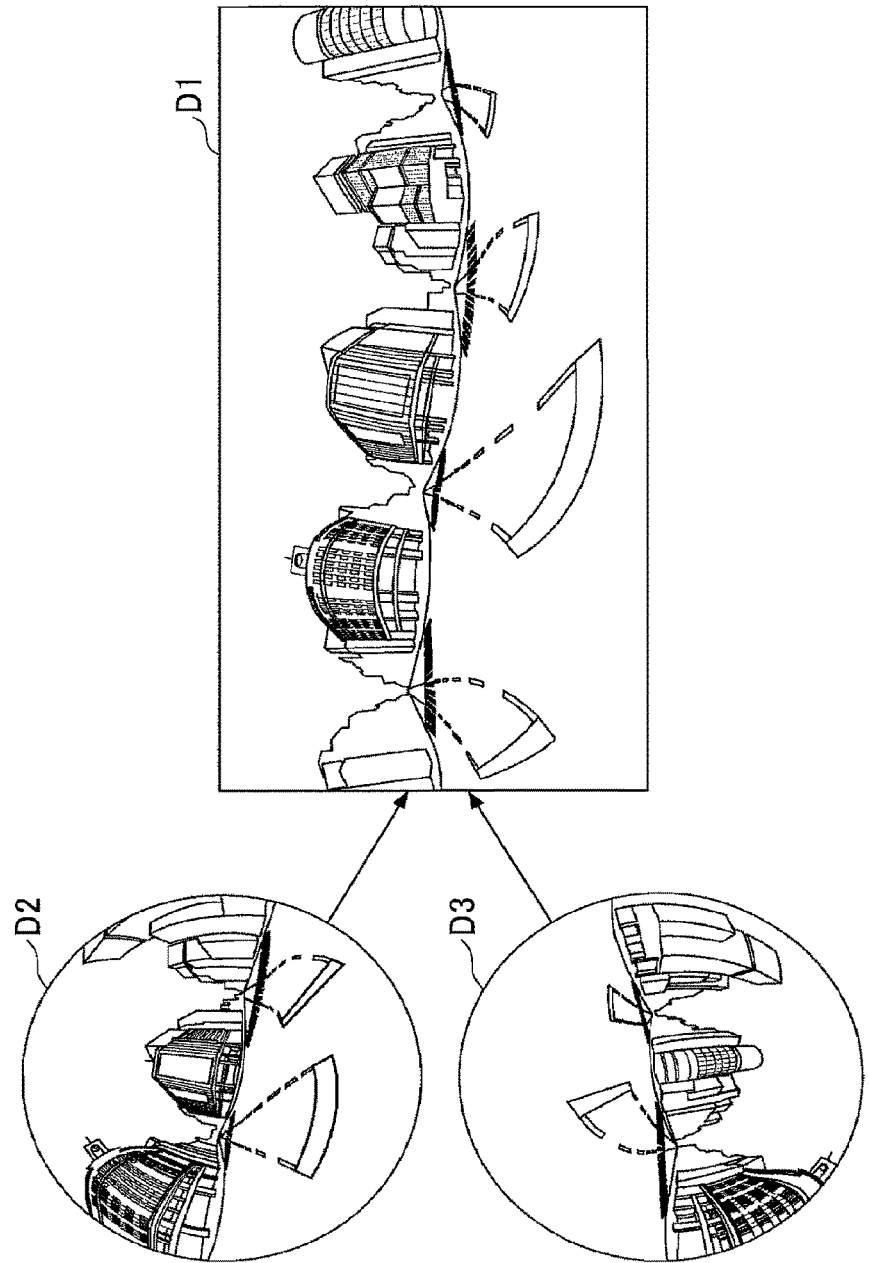

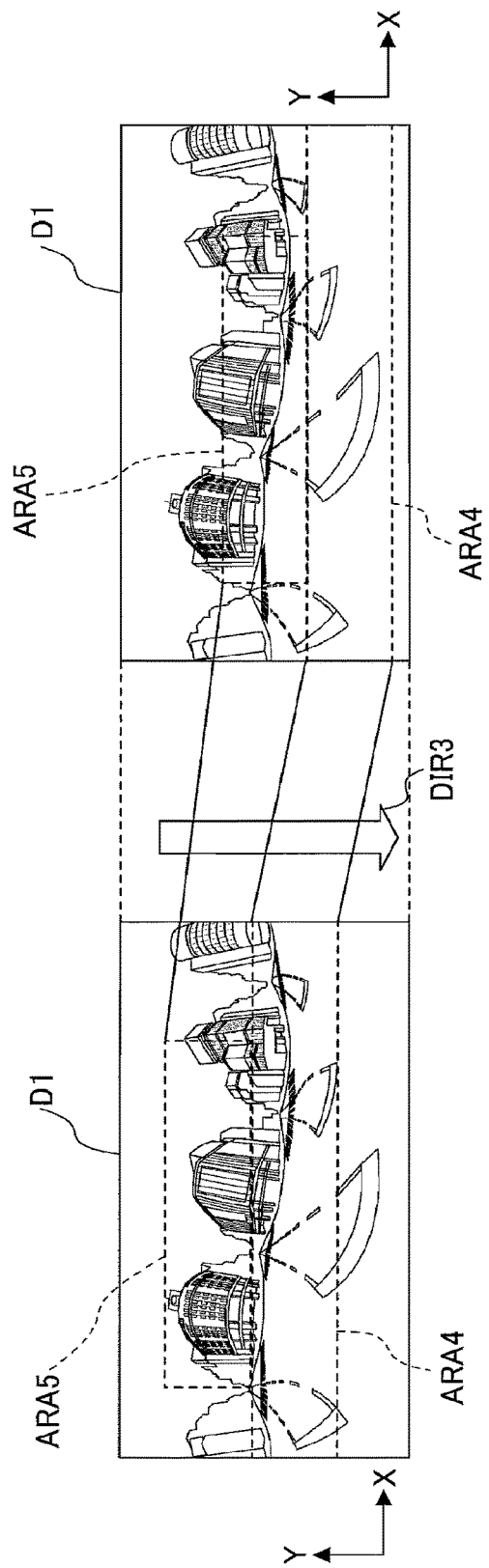

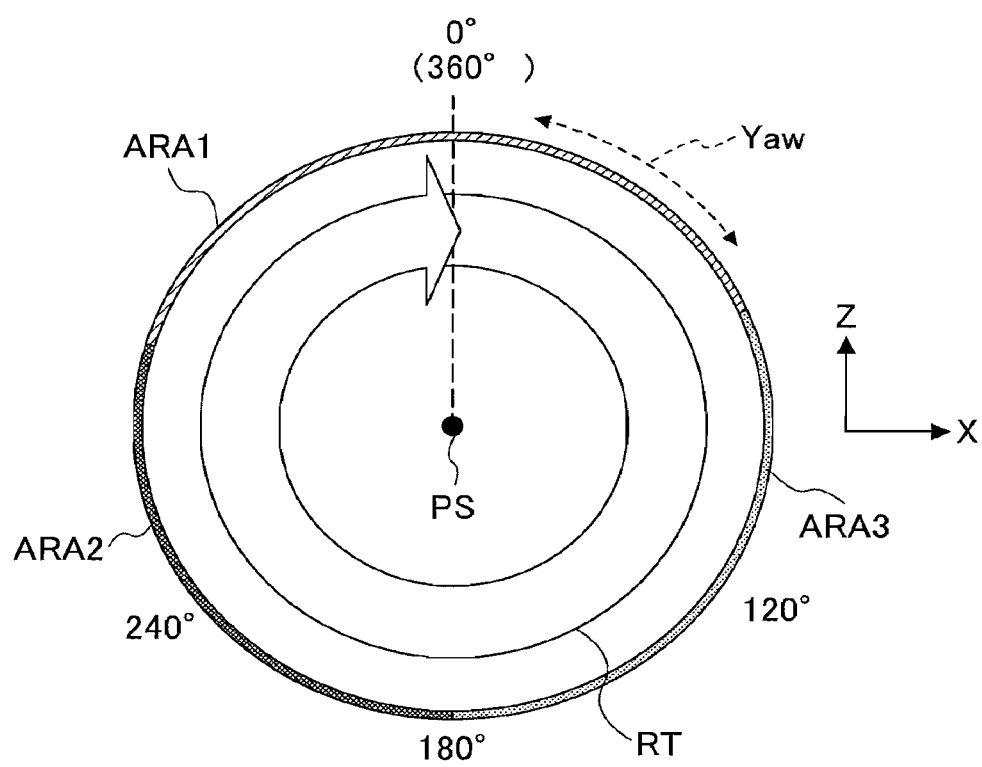

IMAGE DISPLAY SYSTEM, INFORMATION PROCESSING APPARATUS, AND IMAGE DISPLAY METHOD

CROSS-REFERENCE TO RELATED APPLICATIONS

The present application is based upon and claims the benefit of priority of Japanese Patent Application No. 2015-160513, filed on Aug. 17, 2015, the contents of which are incorporated herein by reference in their entirety.

BACKGROUND OF THE INVENTION

1. Field of the Invention

The present disclosure relates to an image display system, an information processing apparatus, and an image display method.

2. Description of the Related Art

Conventionally, a display device which performs adjustment according to a supplied image when displaying an image is known in the art. For example, there is known a method for performing a display-related adjustment based on attributes of image data supplied from a mobile terminal, in order to eliminate the necessity of manually operated adjustment or preliminary registration. For example, see Japanese Unexamined Patent Application Publication No. 2013-003327.

Further, there is known a video signal processing method in which, when a video signal input source is switched to another input source, a display adjustment value is switched to a specific display adjustment value according to an external device, which eliminates the necessity of user's manual adjustment operations. For example, see Japanese Unexamined Patent Application Publication No. 2008-033138.

Further, there is known a method in which when content data is displayed, a time to display a setting content data is made to be consistent with a time to actually display the content data. For example, see Japanese Unexamined Patent Application Publication No. 2015-055827.

SUMMARY OF THE INVENTION

In one embodiment, the present disclosure provides an image display system which displays a display image and includes at least one display device and at least one information processing apparatus connected to the display device, the information processing apparatus comprising a processor configured to implement an input unit configured to receive a plurality of image data items and parameters related to the display image, a determination unit configured to determine areas of an image indicated by the image data items, which areas are displayed by the display device as partial images of the display image, based on the parameters, a setting unit configured to set up a switching condition for switching the image data items, a switching unit configured to switch the image data items when the switching condition is met, and a transmission unit configured to transmit data indicating the areas to the display device, and the display device is configured to display the areas determined by the determination unit at intervals of a predetermined time.

The object and advantages of the invention will be implemented and attained by means of the elements and combinations particularly pointed out in the claims. It is to be understood that both the foregoing general description and the following detailed description are exemplary and explanatory and are not restrictive of the invention as claimed.

BRIEF DESCRIPTION OF THE DRAWINGS

FIG. 3A, FIG. 3B, and FIG. 3C are diagrams illustrating examples of an omnidirectional camera and an omnidirectional image.

FIG. 13A and FIG. 13B are diagrams illustrating an example of a vertical direction processing result of the overall process by the image display system according to one embodiment.

FIG. 14A and FIG. 14B are diagrams illustrating an example of image switching by the image display system according to one embodiment.

DETAILED DESCRIPTION OF THE PREFERRED EMBODIMENTS

A description will be given of embodiments with reference to the accompanying drawings.

First, an overall configuration of an image display system according to one embodiment will be described. One aspect of the present embodiment is to provide an image display system which is capable of switching display images at intervals of a predetermined time when a switching condition is met, based on input parameters.

Figure 1:
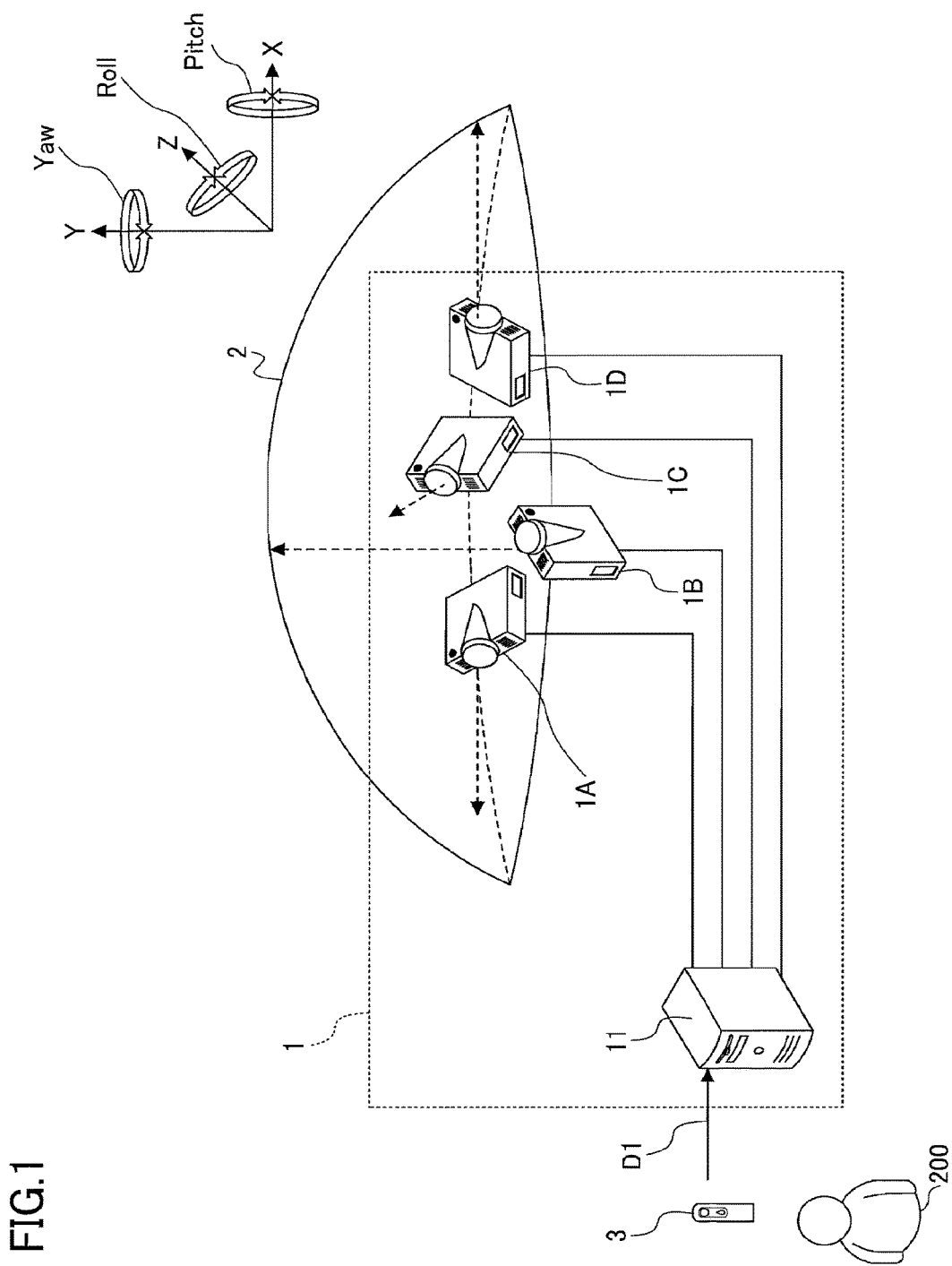
FIG. 1 is a block diagram illustrating an overall configuration of an image display system according to one embodiment.

FIG. 1 illustrates an overall configuration of an image display system 1 according to the present embodiment. As illustrated in FIG. 1, the image display system 1 includes a personal computer (PC) 11 (which is an example of an information processing apparatus) and a projector (which is an example of a display device). In the following, a description will be given of an example of the image display system 1 including a single PC 11 and four projectors including a first projector 1A, a second projector 1B, a third projector 1C, and a fourth projector 1D as illustrated in FIG. 1.

Image data D1 is input to the PC 11. For example, the image data D1 may be image data indicating an omnidirectional image which is taken by an omnidirectional camera 3 with a field of view covering all directions of a user 200. After the image data D1 is input to the PC 11, the PC 11 displays an image on each of the projectors 1A, 1B, 1C, and 1D based on the image data D1, and displays a combined image in which the images displayed on the projectors are combined together (which combined image is called a display image) on a screen 2.

Note that the image data D1 is not restricted to image data indicating still pictures, and it may be image data indicating motion pictures.

It is assumed that optical axes of the four projectors are placed in mutually different directions as illustrated in FIG. 1. For example, the optical axes of the first projector 1A, the third projector 1C, and the fourth projector 1D are parallel to a horizontal direction, and the optical axis of the second projector 1B is parallel to a vertical direction perpendicular to the horizontal direction.

In the following, a horizontal direction (equivalent to a depth direction in FIG. 1) indicated by the optical axis of the third projector 1C is considered as a front direction, and this direction is set to a Z-axis. Moreover, a right hand horizontal direction (equivalent to a horizontal direction in FIG. 1) to the Z-axis is set to an X-axis. Further, a vertical direction (equivalent to an up/down direction in FIG. 1) perpendicular to the Z-axis and the X-axis is set to a Y-axis. Further, rotation around the X-axis is called Pitch rotation, rotation around the Y-axis is called Yaw rotation, and rotation around the Z-axis is called Roll rotation.

Figure 2A:
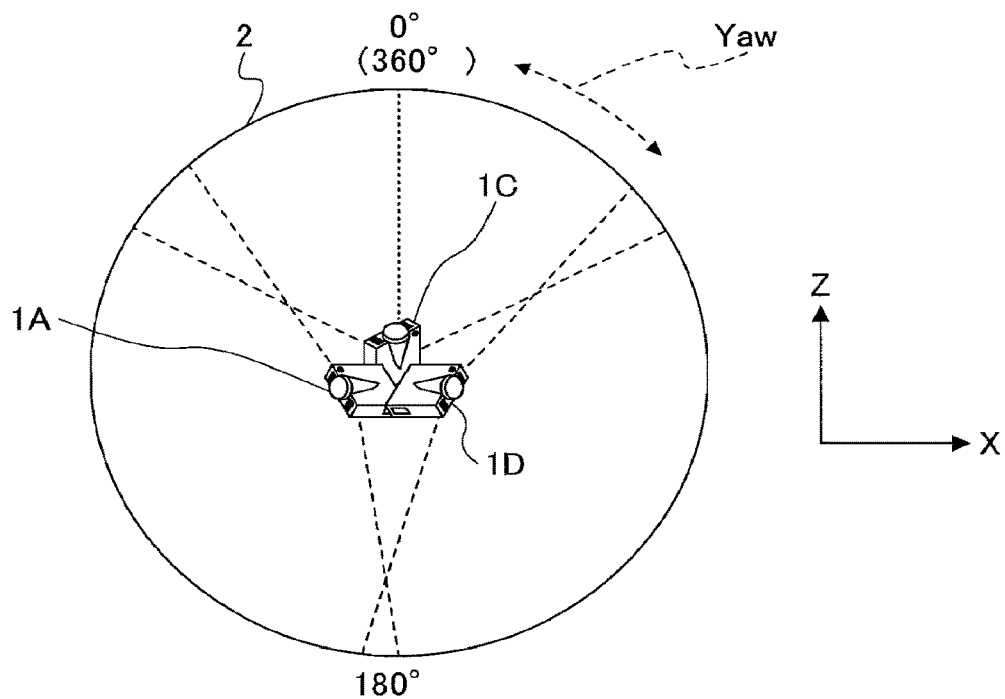
FIG. 2A and FIG. 2B are diagrams illustrating an example of a display image displayed by the image display system according to one embodiment.
Figure 2B:
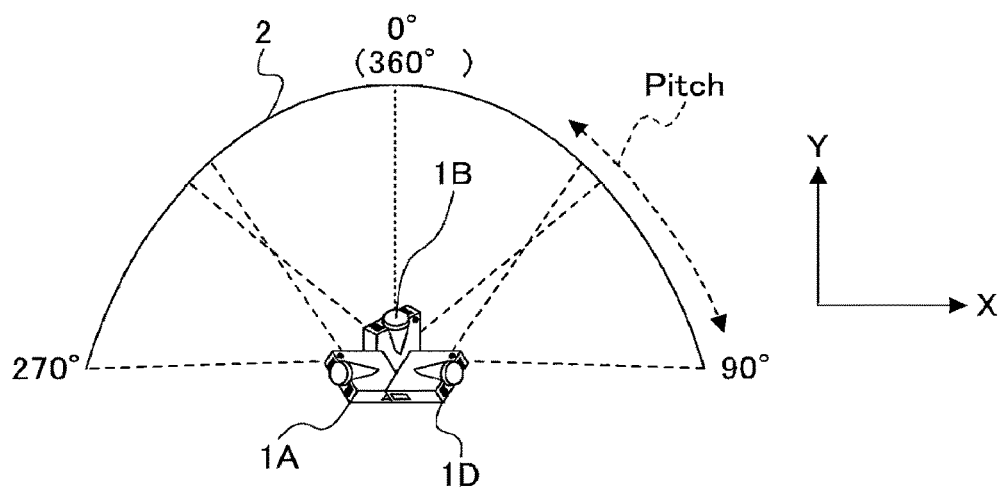

FIG. 2A and FIG. 2B are diagrams illustrating an example of a display image displayed by the image display system 1 according to one embodiment. FIG. 2A is a plan view of the display image and FIG. 2B is a side view of the display image. In the following, an angle to which the optical axis of the third projector 1C points on the horizontal plane is set to a starting point of a horizontal angle with respect to a Yaw rotation (which angle is called a Yaw angle). At the starting point, the Yaw angle is equal to 0 degrees. On the other hand, an angle to which the optical axis of the third projector 1C points on the vertical plane, which angle is parallel to the horizontal plane, is set to a starting point of a vertical angle with respect to a Pitch rotation (which angle is called a Pitch angle). At the starting point, the Pitch angle is equal to 0 degrees. A state where the Pitch angle is equal to 0 degrees is called a vertical state, and the Pitch angle of the optical axis of the second projector 1B in the vertical state is equal to 0 degrees.

For example, as illustrated in FIG. 2A, the first projector 1A, the third projector 1C, and the fourth projector 1D display mutually different 120-degrees portions of a display image, so that a combined image in which the image portions are combined together (the display image) is displayed on the screen 2.

First, the plan view of the display image illustrated in FIG. 2A will be described. In FIG. 2A, the third projector 1C displays primarily the corresponding image portion where the Yaw angle is in a range of 300 through 360 degrees and in a range of 0 through 60 degrees, the fourth projector 1D displays primarily the corresponding image portion where the Yaw angle is in a range of 60 through 180 degrees, and the first projector 1A displays primarily the corresponding image portion where the Yaw angle is in a range of 180 through 300 degrees. Note that the image portions displayed by the projectors may overlap each other as illustrated.

Thus, the image portions displayed by the three projectors cover the 120-degree Yaw angle ranges, and the image display system 1 is capable of displaying a display image which covers the 360-degree Yaw angle range in the horizontal direction.

Next, the side view of the display image illustrated in FIG. 2B will be described. In FIG. 2B, each of the first projector 1A, the third projector 1C, and the fourth projector 1D displays primarily the corresponding image portion where the Pitch angle is in a range of 30 through 90 degrees and in a range of 270 through 330 degrees. The second projector 1B displays primarily the corresponding image portion where the Pitch angle is in a range of 0 through 30 degrees and in a range of 330 through 360 degrees. Note that the image portions displayed by the projectors may overlap each other as illustrated.

Thus, the image portions displayed by the projectors cover the 60-degree Pitch angle ranges, and the image display system 1 is capable of displaying a display image which covers the 180-degree Pitch angle range in the vertical direction.

Note that the image portions displayed by the projectors may not be even. Note that the screen 2 may be a display screen or the like.

Note that the number of display devices included in the image display system 1 may not be restricted to four, and a different number of display devices may be included in the image display system 1. Note that the information processing apparatus included in the image display system 1 may not be restricted to the PC 11, and the information processing apparatus may be any of a server, a mobile PC, a smart phone, and a tablet. Note that the information processing apparatus may be replaced with an information processing system including a plurality of information processing apparatuses, and the information processing system may include a PC and a tablet.

It is preferable that the screen 2 has a hemispherical shape as illustrated. Namely, it is preferable that an object where a display image is displayed is an object having a hemispherical shape as illustrated. In the present embodiment, the dome-shaped screen 2 has a hemispherical shape, and the image display system 1 is capable of displaying a display image which covers the 360-degree Yaw angle range in the horizontal direction when viewed from the center of the hemisphere as illustrated. However, the screen 2 may not be restricted to the screen having the hemispherical shape, and the screen 2 may have a different shape.

Figure 3A:
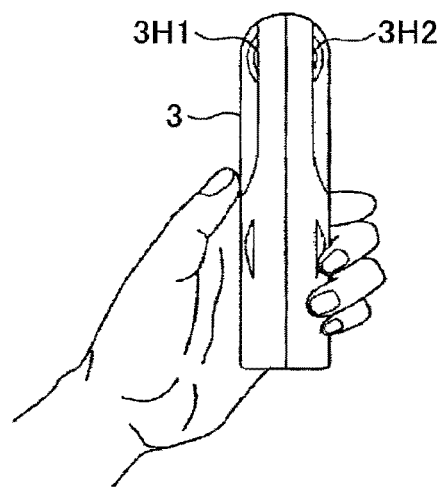
Figure 3B:
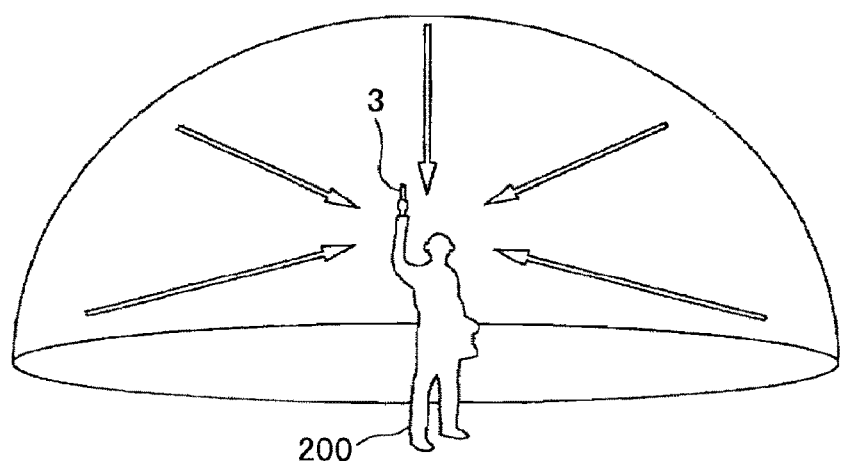

FIGS. 3A, 3B, and 3C are diagrams illustrating examples of an omnidirectional camera 3 and an omnidirectional image according to one embodiment. For example, as illustrated in FIG. 3A, the omnidirectional camera 3 includes a first lens 3H1 and a second lens 3H2. Each of the first lens 3H1 and the second lens 3H2 is implemented by a wide-angle lens or a fisheye lens having a field angle of 180 degrees or more. Namely, the omnidirectional camera 3 is an example of a camera configured to image a scene covering 360 degrees in the horizontal direction and 360 degrees in the vertical direction of the user 200 as illustrated in FIG. 3B. Note that the omnidirectional camera 3 may be implemented by any of an omnidirectional camera, a wide angle camera, a camera using a fisheye lens, and a combination of these cameras.

The omnidirectional camera 3 generates the image data D1 indicating an omnidirectional image. For example, in response to an operation by the user 200, the omnidirectional camera 3 captures an image D2 (captured image D2) using the first lens 3H1 and an image D3 (captured image D3) using the second lens 3H2 simultaneously, each of the images D2 and D3 covering 180 degrees in the horizontal direction as illustrated in FIG. 3C. Subsequently, the omnidirectional camera 3 generates the image data D1 covering 360 degrees in the horizontal direction of the omnidirectional camera 3 in which the captured images D2 and D3 are combined together as illustrated in FIG. 3C. The image data D1 is generated by the omnidirectional camera 3, and the omnidirectional image indicated by the image data D1 may cover 360 degrees in the horizontal direction.

Figure 4:
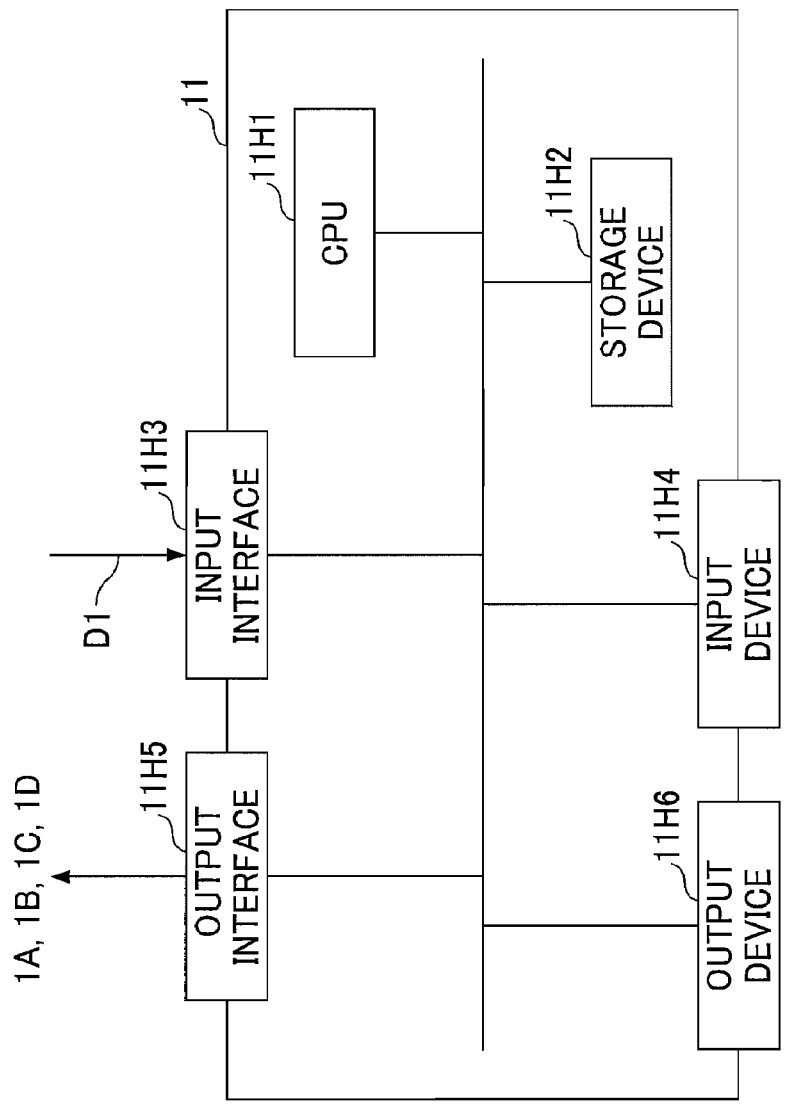
FIG. 4 is a block diagram illustrating a hardware configuration of an information processing apparatus according to one embodiment.

FIG. 4 illustrates a hardware configuration of the information processing apparatus (the PC 11) according to one embodiment. As illustrated in FIG. 4, the PC 11 includes a central processing unit (CPU) 11H1, a storage device 11H2, an input interface 11H3, an input device 11H4, an output interface 11H5, and an output device 11H6.

The CPU 11H1 is a processor configured to perform various processes and processing of various data and control overall operations of hardware elements of the PC 11. Note that the CPU 11H1 may include an arithmetic unit or a control unit configured to support the operations of the CPU 11H1, and the CPU 11H1 may be implemented by a plurality of units.

The storage device 11H2 is configured to store data, programs, and setting values. The storage device 11H2 serves as a memory of the CPU 11H1. Note that the storage device 11H2 may include an auxiliary storage device such as a hard disk drive.

The input interface 11H3 is an interface configured to receive data, such as the image data D1, and operations by the user 200. Specifically, the input interface 11H3 is implemented by a connector and an external device connected to the PC 11 via the connector. Note that the input interface 11H3 may utilize a network or radio communication to receive the data and the operations.

The input device 11H4 is a device configured to receive command-based operations and data. Specifically, the input device 11H4 is implemented by a keyboard, a mouse, etc.

The output interface 11H5 is an interface configured to transmit data from the PC 11 to the projector. Specifically, the output interface 11H5 is implemented by a connector and an external device connected to the PC 11 via the connector. Note that the output interface 11H5 may utilize a network or radio communication to transmit the data to the projector.

The output device 11H6 is a device configured to output data. Specifically, the output device 11H6 is implemented by a display device.

Note that the input device 11H4 and the output device 11H6 may be implemented by a touch-panel display in which an input device and an output device are integrated. Alternatively, the input device 11H4 and the output device 11H6 may be implemented by another information processing apparatus, such as a smart phone or a tablet.

Figure 5:
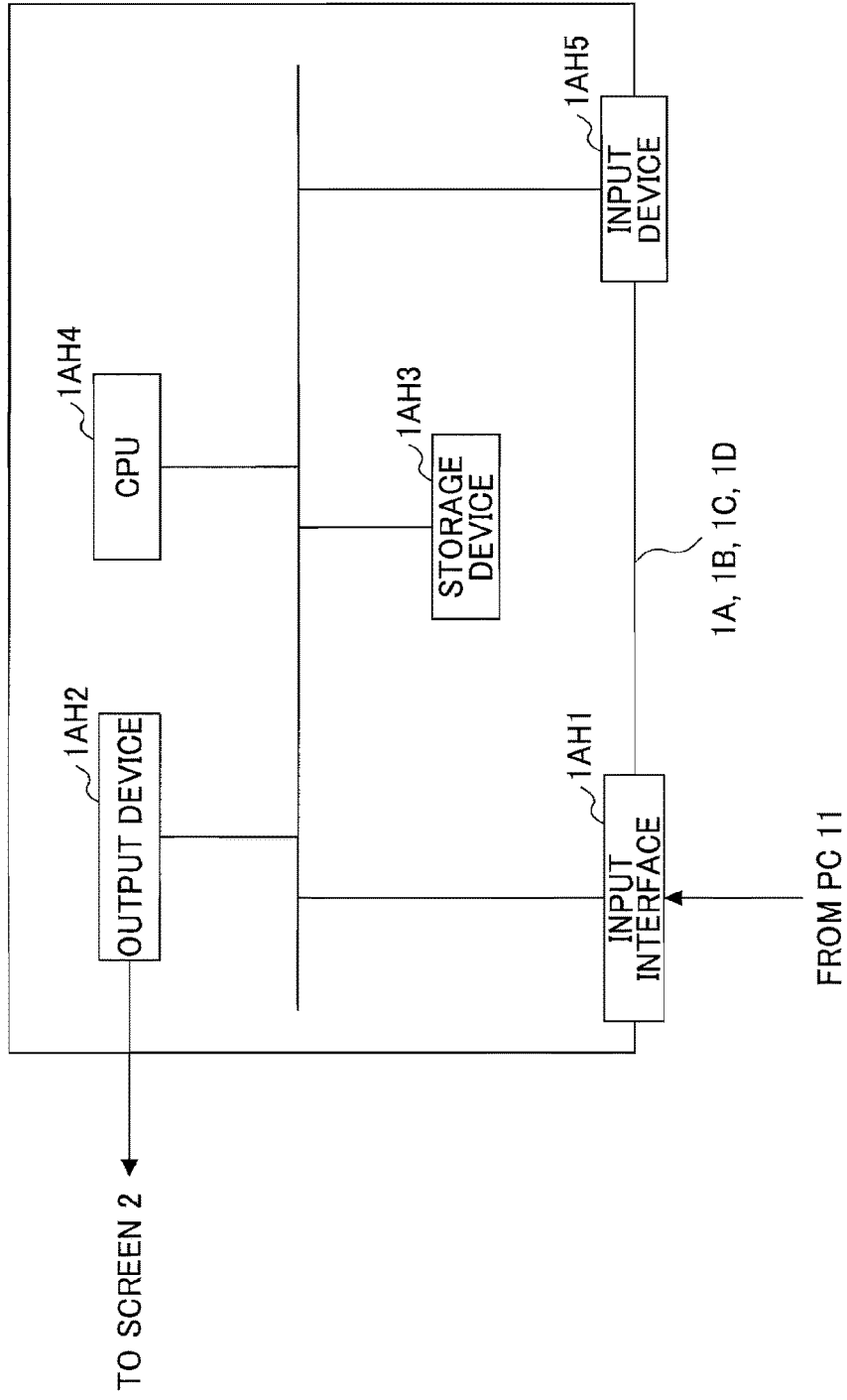
FIG. 5 is a block diagram illustrating a hardware configuration of a display device according to one embodiment.

FIG. 5 illustrates a hardware configuration of the display device (projector) according to one embodiment. Specifically, as illustrated in FIG. 5, each of the first projector 1A, the second projector 1B, the third projector 1C, and the fourth projector 1D includes an input interface 1AH1, an output device 1AH2, a storage device 1AH3, a CPU 1AH4, and an input device 1AH5. In the following, an example in which each of the projectors 1A, 1B, 1C, and 1D has an identical hardware configuration will be described.

The input interface 1AH1 is an interface configured to input data or signals from the PC 11 to the projector. Specifically, the input interface 1AH1 is implemented by a connector, a driver, and a dedicated integrated circuit (IC).

The output device 1AH2 is implemented by optical components, such as lenses, and a light source. The output device 1AH2 is configured to display an image based on the input data or signals.

The storage device 1AH3 is configured to store data, programs, and setting values. The storage device 1AH3 is implemented by a main storage device, such as a memory, an auxiliary storage device such as a hard disk drive, or a combination of the main and auxiliary storage devices.

The CPU 1AH4 is a processor configured to perform various processes and processing of various data and control overall operations of hardware elements of the projector. Note that the CPU 1AH4 may include an arithmetic unit or a control unit configured to support the operations of the CPU 1AH4, and the CPU 1AH4 may be implemented by a plurality of units.

The input device 1AH5 is a device configured to input command-based operations and data. Specifically, the input device 1AH5 is implemented by a switch, a keyboard, and a mouse.

Each of the projectors 1A, 1B, 1C, and 1D is configured to use the input interface 1AH1 to input data or signals based on image data through a network, radio communication such as near field communication (NFC), or its combination, and display an image. Note that each projector may use a recording medium, such as a universal serial bus (USB) memory, to input the data.

Figure 6:
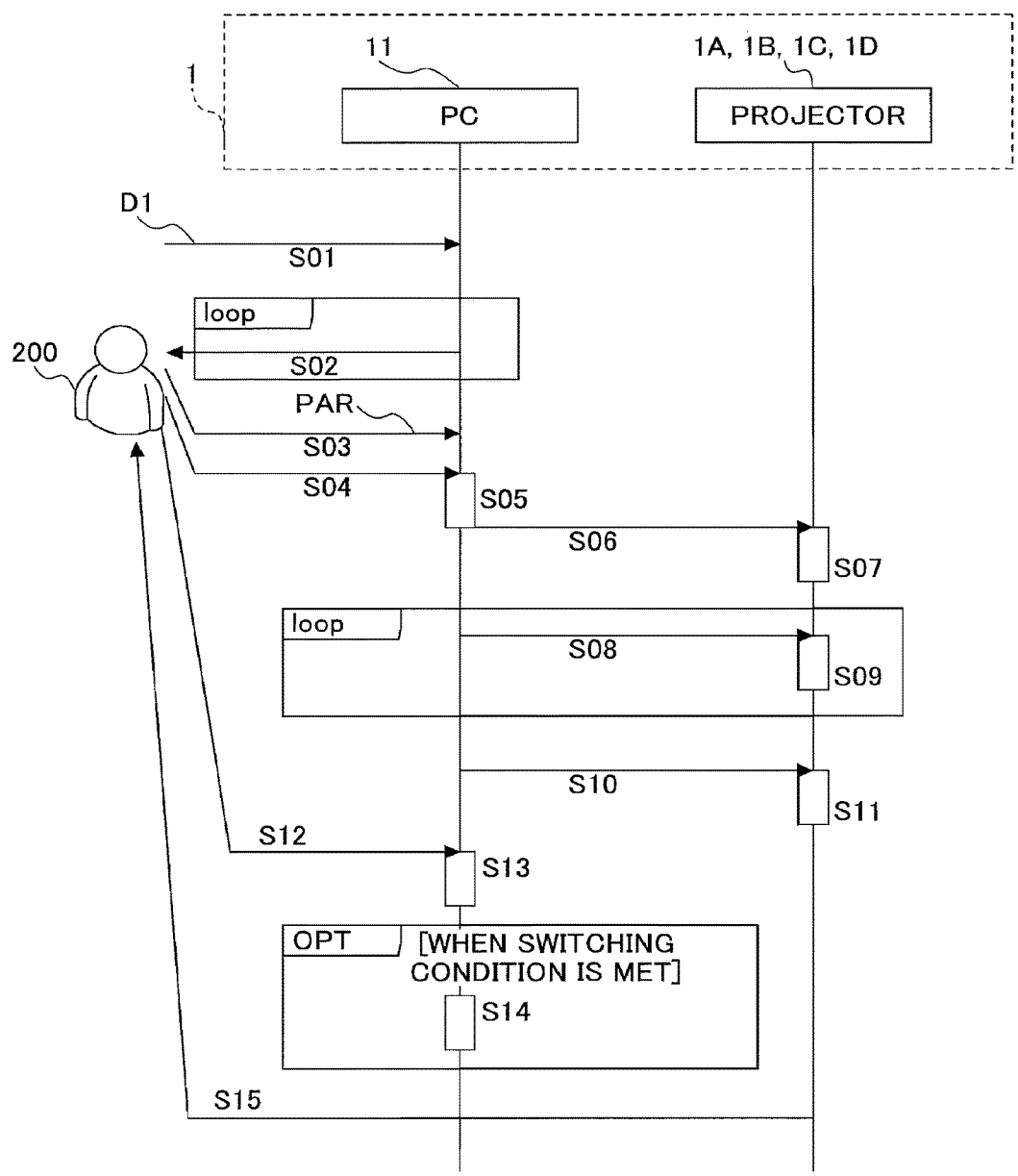
FIG. 6 is a sequence diagram for explaining an overall process performed by the image display system according to one embodiment.

FIG. 6 is a sequence diagram for explaining an overall process performed by the image display system according to one embodiment.

As illustrated in FIG. 6, in step S01, the PC 11 receives image data items D1. For example, the image data items D1 are input from the omnidirectional camera 3 (FIG. 1) to the PC 11.

In step S02, the PC 11 displays a list of display images to the user 200. Note that the processing of step S02 is repeatedly performed until an operation to select a display image is performed by the user 200.

In step S03, the PC 11 receives parameters input by the user 200. For example, the PC 11 displays a graphical user interface (GUI), such as a setting screen, and receives the parameters in response to a user's input operation to the setting screen. Note that the parameters may be input in the form of data or commands.

In step S04, the PC 11 receives a display instruction input by the user 200. For example, the operation to input the display instruction may be an operation of pressing a start button or the like on the PC 11 by the user 200.

In step S05, the PC 11 generates setting data based on the received parameters. The setting data is to be output to the projectors 1A through 1D.

In step S06, the PC 11 outputs the setting data generated based on the parameters at the step S05, to each of the projectors 1A through 1D.

In step S07, each of the projectors 1A through 1D stores the setting data output from the PC 11 at the step S06.

In step S08, the PC 11 outputs display data items for indicating the display image selected by the user 200 at the step S02, to the projectors 1A through 1D, respectively.

In step S09, the projectors 1A through 1D store the display data items output from the PC 11 at the step S08, respectively.

The processing of steps S08 and S09 is repeatedly performed until all the display data items are output and stored.

In step S10, the PC 11 receives a display start instruction input by the user 200 for starting displaying based on the setting data. In response to the display start instruction, the PC 11 outputs to each of the projectors 1A through 1D a message indicating that the uploading is completed, or a message indicating that the displaying is started.

In step S11, each of the projectors 1A through 1D verifies the setting data stored at the step S07. For example, the verification is made by determining whether the setting data conforms to a predetermined format. When the setting data does not conform to the predetermined format as a result of the verification, each of the projectors 1A through 1D performs an error process. Note that this error process may be a process which displays an error message.

In step S12, the PC 11 sets up a switching condition for switching the image data. Specifically, the switching condition is set to a rotation of the display image over a predefined rotational angle. For example, in a case where the display image is set up to be rotated in the horizontal direction according to the parameters, the switching condition is set to a 360-degree rotation in the horizontal direction. In this case, when the display image is rotated 360 degrees or greater in the horizontal direction, the switching condition is met and the current display image is switched to a following display image so that the following display image is displayed.

The following description will be given with the assumption that the display image is set up to be rotated in the horizontal direction and the switching condition is set to the 360-degree rotation in the horizontal direction.

In step S13, the PC 11 determines whether the switching condition is met. When it is determined at step S13 that the switching condition is met ([WHEN SWITCHING CONDITION IS MET] as indicated in FIG. 6), the PC 11 continues to perform step S14. On the other hand, when it is determined at step S13 that the switching condition is not met, the PC 11 performs step S15 without performing step S14.

In step S14, the PC 11 switches the image data D1.

In step S15, the PC 11 controls the projectors 1A through 1D to display the images according to the setting data based on the parameters stored at step S07 so that the display image is switched at intervals of a predetermined time.

Note that the sequence of the above steps S01-S15 is not restricted to the sequence illustrated in FIG. 6. For example, the processing of steps S01 and S02 and the processing of step S03 may be performed in reverse sequence or may be performed in parallel. Further, the processing of step S05, the processing of steps S06 and S07, and the processing of steps S08 and S09 may be performed in reverse sequence or may be performed in parallel. Further, the processing of step S11 may be performed after the processing of step S07.

Note that the setting of the switching condition is not restricted to the processing of step S12. For example, the switching condition may be set up according to the parameters. Further, the processing of step S12 may be performed in a sequence different from the sequence illustrated in FIG. 6. Further, all or a part of the above steps may be performed simultaneously, in a distributed manner, or redundantly.

Figure 7B:
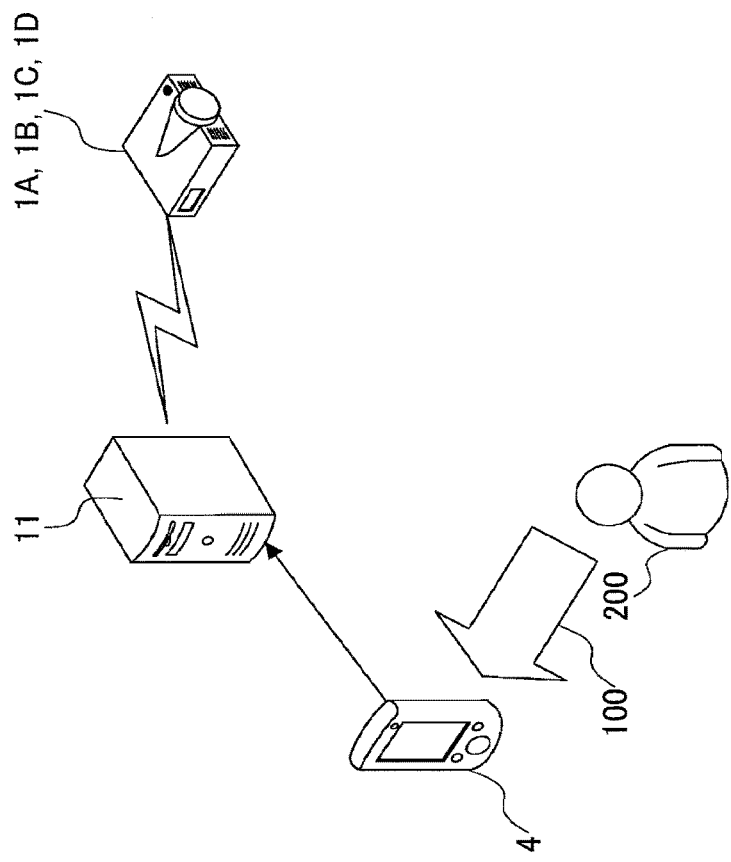
FIG. 7A and FIG. 7B are diagrams illustrating examples of input operations on the information processing apparatus according to one embodiment.
Figure 7A:
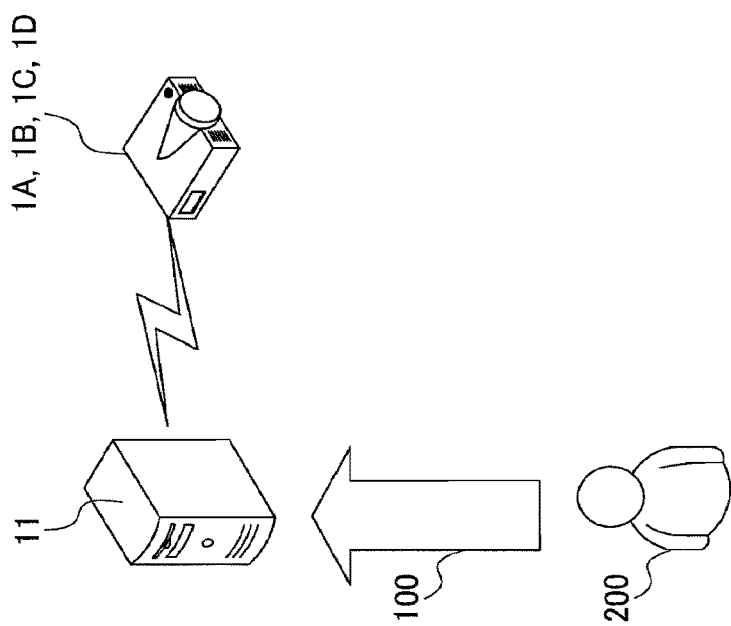

FIG. 7A and FIG. 7B illustrate examples of input operations on the information processing apparatus according to one embodiment.

For example, as illustrated in FIG. 7A, the user 200 performs an operation 100 on the PC 11. In the overall process illustrated in FIG. 6, the operation 100 is performed by the user in any of step S01, step S03, and step S04.

Further, as illustrated in FIG. 7B, the user 200 may perform an operation 100 on a tablet 4. The following description will be given with the assumption that the user 200 performs an input operation on an operation screen displayed on the tablet 4.

FIGS. 8A through 8F illustrate examples of operation screens used to input image data. For example, the tablet 4 displays an operation screen as illustrated on a touch panel provided in the tablet 4. The user touches the touch panel by his fingers or a pen device to perform an input operation on the operation screen.

Figure 8A:
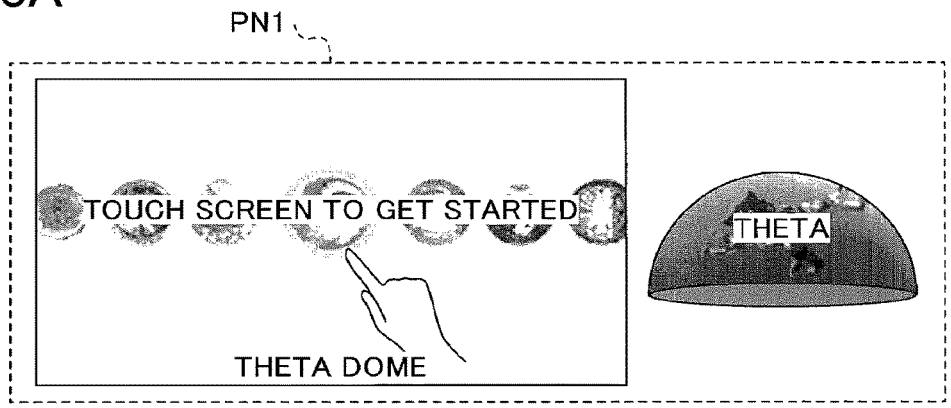
FIGS. 8A through 8F are diagrams illustrating examples of operation screens used to input image data.
Figure 8B:
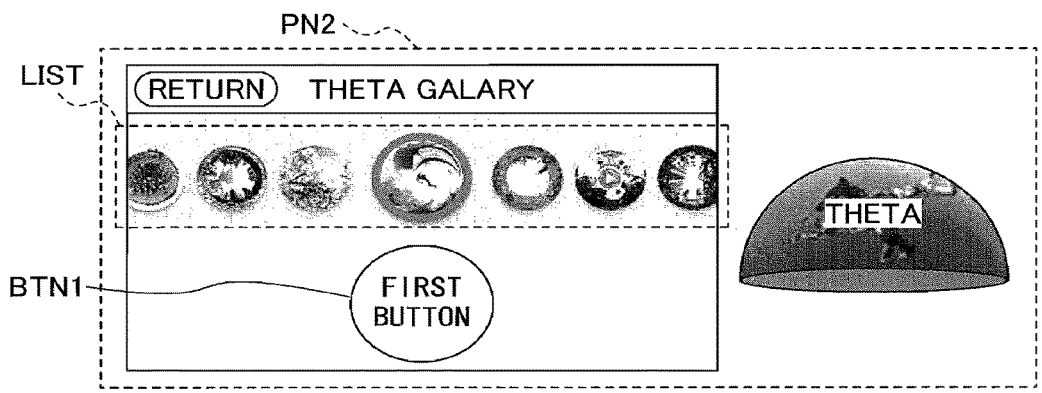

For example, the tablet 4 displays a first operation screen PN1 illustrated in FIG. 8A. When the user touches the first operation screen PN1 illustrated in FIG. BA, the tablet 4 displays a second operation screen PN2 illustrated in FIG. 8B. The displayed second operation screen PN2 includes a list of reduced omnidirectional images (LIST) as illustrated in FIG. 8B or a list of thumbnail images. Namely, the second operation screen PN2 is an example of the list displayed at the step S02 illustrated in FIG. 6. Note that the images included in the displayed list are omnidirectional images which are input beforehand to the tablet 4 (or the information processing apparatus 11).

Note that the images may be input from the external device, such as the omnidirectional camera 3 (FIG. 1). For example, the second operation screen PN2 includes a first button BTN1 which is used to connect the tablet 4 to the omnidirectional camera 3 when the first button BTN1 is pressed. Specifically, when the first button BTN1 is pressed by the user, the tablet 4 displays a third operation screen PN3 illustrated in FIG. 8C.

Figure 8C:
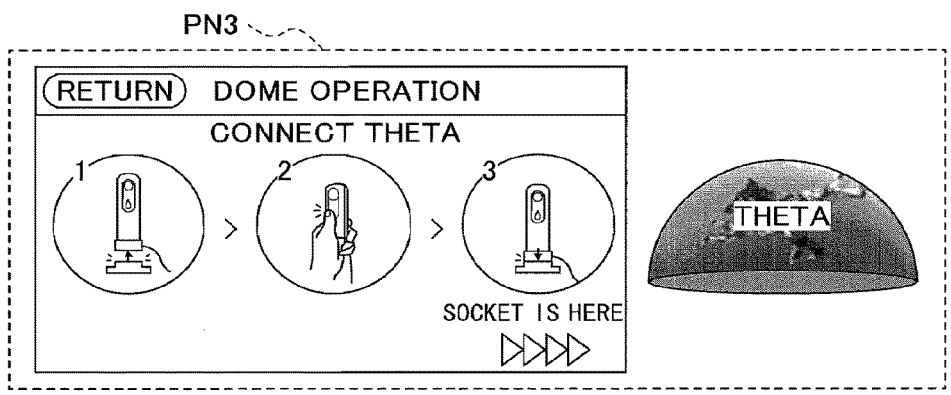

The third operation screen PN3 may be a guide screen for connecting the tablet 4 (or the information processing apparatus 11) to the omnidirectional camera 3 as illustrated in FIG. 8C. When the third operation screen PN3 is displayed, the user 200 performs an operation to connect the tablet 4 to the omnidirectional camera 3. When the tablet 4 is connected to the omnidirectional camera 3, the tablet 4 displays a fourth operation screen PN4 illustrated in FIG. 8D.

Figure 8D:
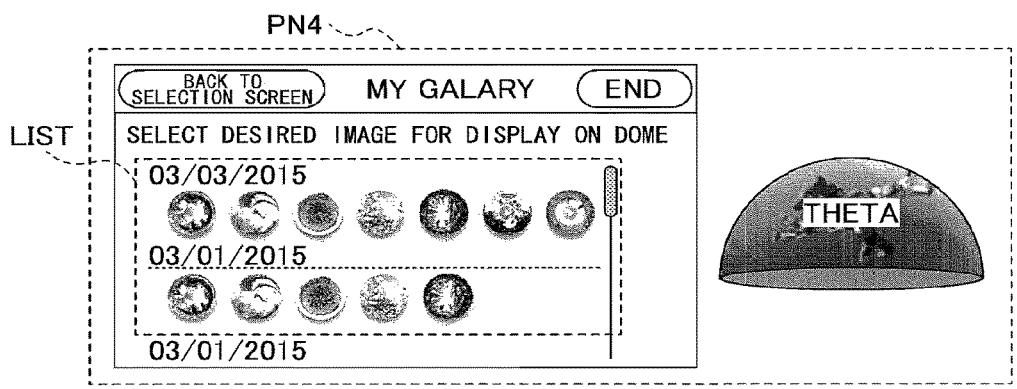

The fourth operation screen PN4 is displayed in list form, similar to the second operation screen PN2 illustrated in FIG. 8B, to indicate a list of images (LIST) stored in the omnidirectional camera 3. The list of the images (LIST) is displayed as illustrated in FIG. 8D. When an image (first selection image) is selected from among the images of the list by the user 200, the tablet 4 displays a fifth operation screen PN5 with the first selection image being focused as illustrated in FIG. 8E.

When a thumbnail image SImg1 of the first selection image in the fifth operation screen PN5 is pressed, the tablet 4 displays a preview image Img1 of the first selection image.

Figure 8E:
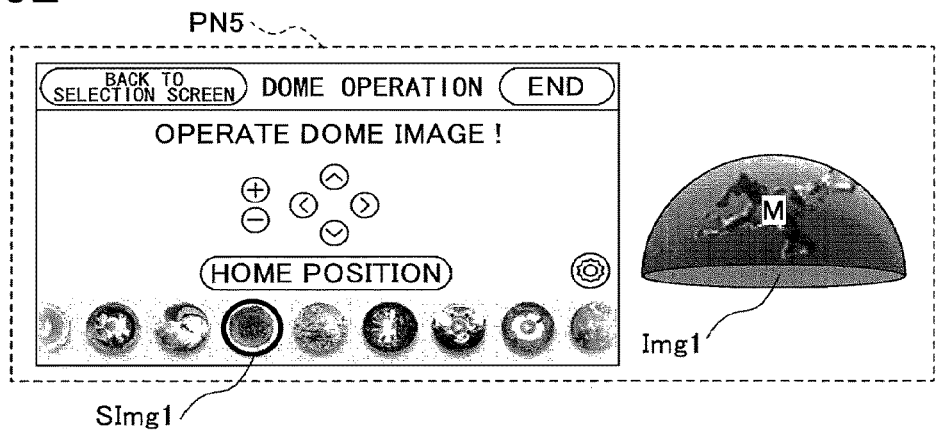
Figure 8F:
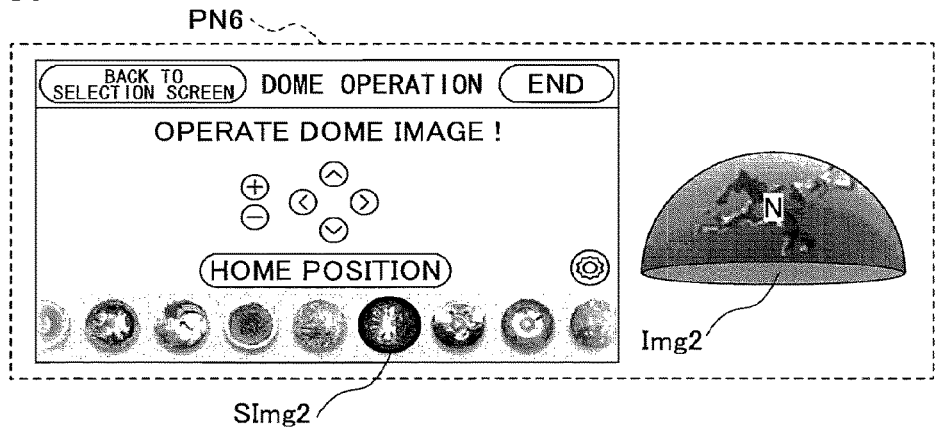

Alternatively, in the fifth operation screen PN5 illustrated in FIG. 8E, an operation to select another image (second selection image) different from the first selection image may be performed by the user 200. For example, when a thumbnail image SImg2 of the second selection image in the fifth operation screen PN5 is pressed, the tablet 4 displays a sixth operation screen PN6 as illustrated in FIG. 8F. In the sixth operation screen PN6, a preview image Img2 of the second selection image is displayed as illustrated in FIG. 8F.

Next, various examples in which the parameters are input using the operation screens will be described.

Figure 9A:
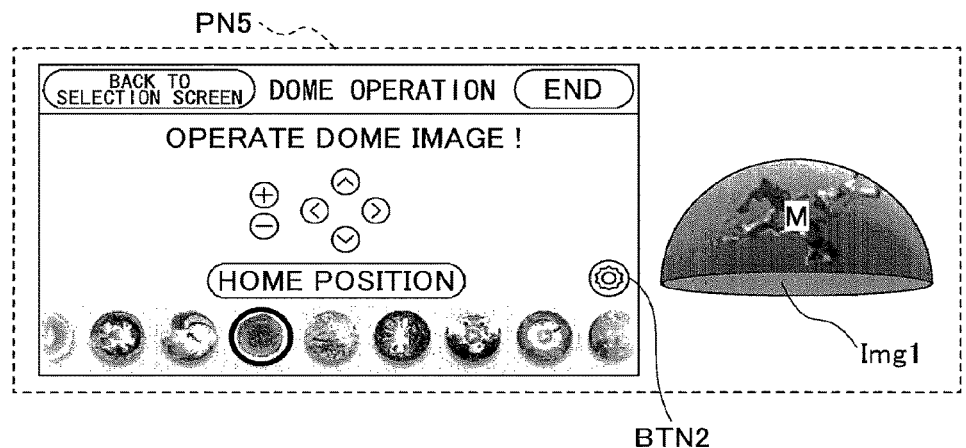
FIGS. 9A through 9F are diagrams illustrating examples of operation screens used to input parameters.
Figure 9B:
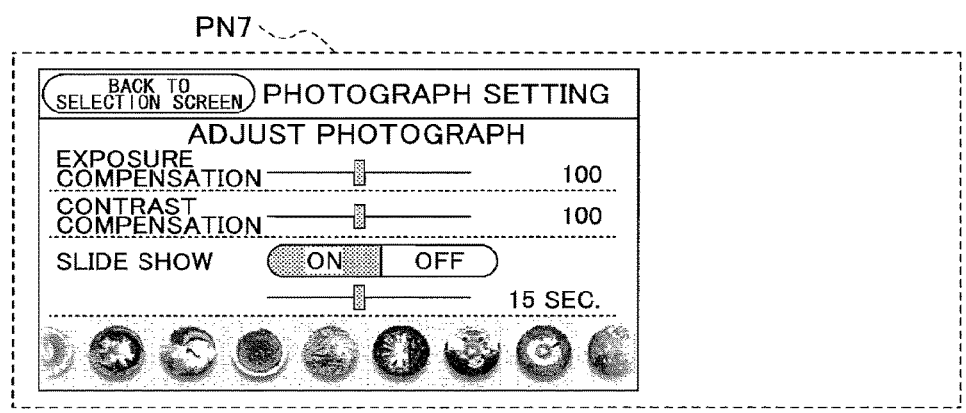

FIGS. 9A through 9F illustrate examples of operation screens used to input the parameters. For example, it is assumed that the operation screen used to input the parameters is output when a GUI, such as a setup button, included in the fifth operation screen PN5 illustrated in FIG. 8E, is pressed. Specifically, when the fifth operation screen PN5 includes a setup button BTN2 as illustrated in FIG. 9A and the setup button BTN2 is pressed by the user, the tablet 4 displays a seventh operation screen PN7 as illustrated in FIG. 9B.

For example, some of the parameters in the step S03 of the overall process of FIG. 6 may be input by a user's input operation to the seventh operation screen PN7. Specifically, a brightness parameter to set up a brightness of a display image may be input using a GUI "exposure compensation" indicated in the seventh operation screen PN7 of FIG. 9B. Further, a contrast parameter to set up a contrast of a display image may be input using a GUI "contrast compensation" indicated in the seventh operation screen PN7 of FIG. 9B. Further, a switch parameter indicating whether to perform a slide show (in which the image data for displaying a display image is switched at intervals of a predetermined time) may be input using buttons "ON" and "OFF" associated with a GUI "slide show" indicated in the seventh operation screen PN7 of FIG. 9B. Note that when a slide show is performed, a time parameter indicating the predetermined time of each interval at which the image data is switched during the slide show is also input as a setting value. In the example of FIG. 9B, the time parameter indicating "15 seconds" as the setting value for the predetermined time of the interval at which the image data is switched when the slide show is performed is input.

In addition, a horizontal direction parameter indicating one of horizontal directions in which a display image is rotated, and a horizontal rotation speed parameter indicating a rotational speed for rotating the display image in the horizontal direction may be input. Further, a vertical direction parameter indicating one of vertical directions in which a display image is rotated, and a vertical rotation speed parameter indicating a rotational speed for rotating the display image in the vertical direction may be input.

Figure 9C:
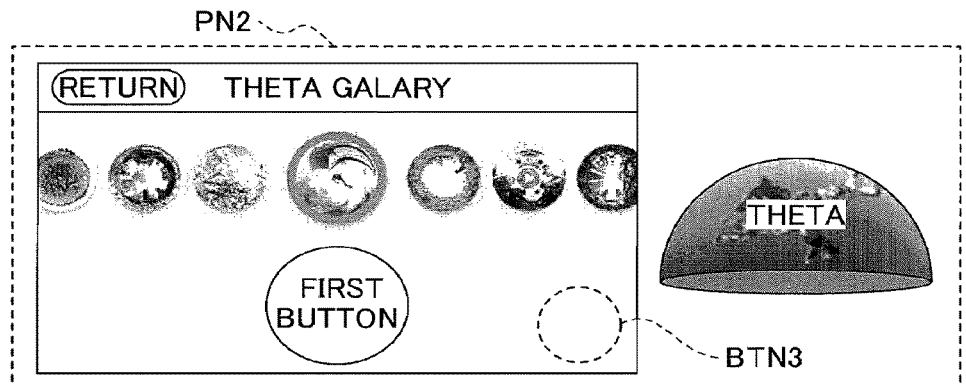

In the following, an example in which the horizontal direction parameter, the horizontal rotation speed parameter, the vertical direction parameter, and the vertical rotation speed parameter are set up by an administrator of the image display system 1 will be described. Specifically, when a right-hand lower portion BTN3 of the second operation screen PN2 illustrated in FIG. 8S or FIG. 9C is held down about 10 seconds, the tablet 4 displays an eighth operation screen PN8 as illustrated in FIG. 9D.

Figure 9D:
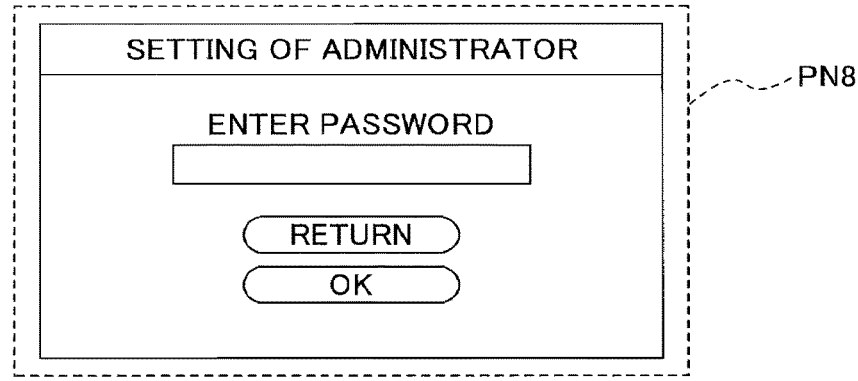

The eighth operation screen PN8 is a screen for causing the administrator to enter a password of the administrator as illustrated in FIG. 9D. When a password of the administrator consistent with a registered password of the administrator is entered, the tablet 4 displays a ninth operation screen PN9 as illustrated in FIG. 9E.

The ninth operation screen PN9 is an example of a setting of administrator screen. For example, the password of the administrator may be changed using the ninth operation screen PN9. Specifically, when a password change button BTN4 in the ninth operation screen PN9 is pressed, the tablet 4 displays a tenth operation screen PN10 as illustrated in FIG. 9F.

A new password may be entered using the tenth operation screen PN10. When the new password is entered, the password of the administrator is changed to the new password.

Figure 9E:
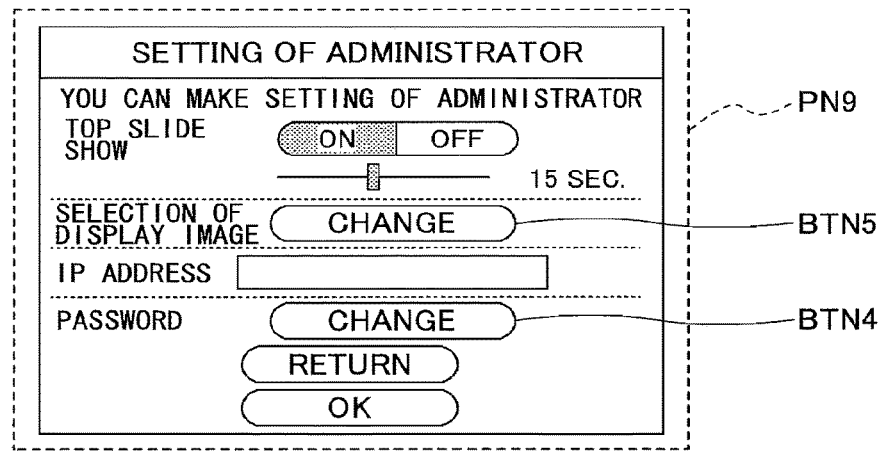
Figure 9F:
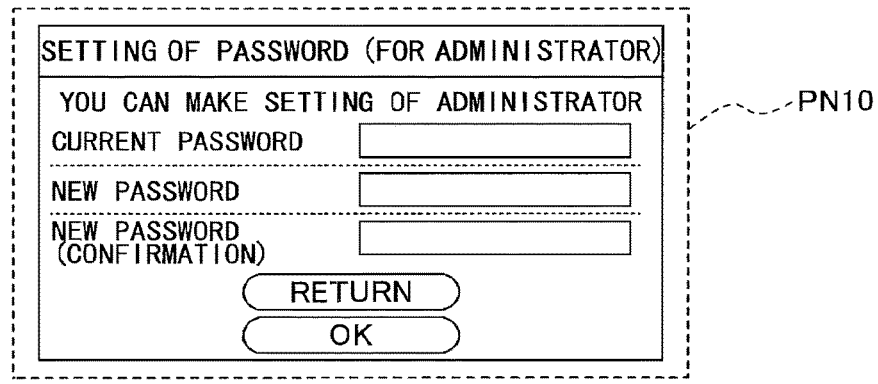

On the other hand, when a display image selection button BTN5 in the ninth operation screen PN9 illustrated in FIG. 9E is pressed, the tablet 4 displays an operation screen in which image data name parameters may be input.

Figure 10A:
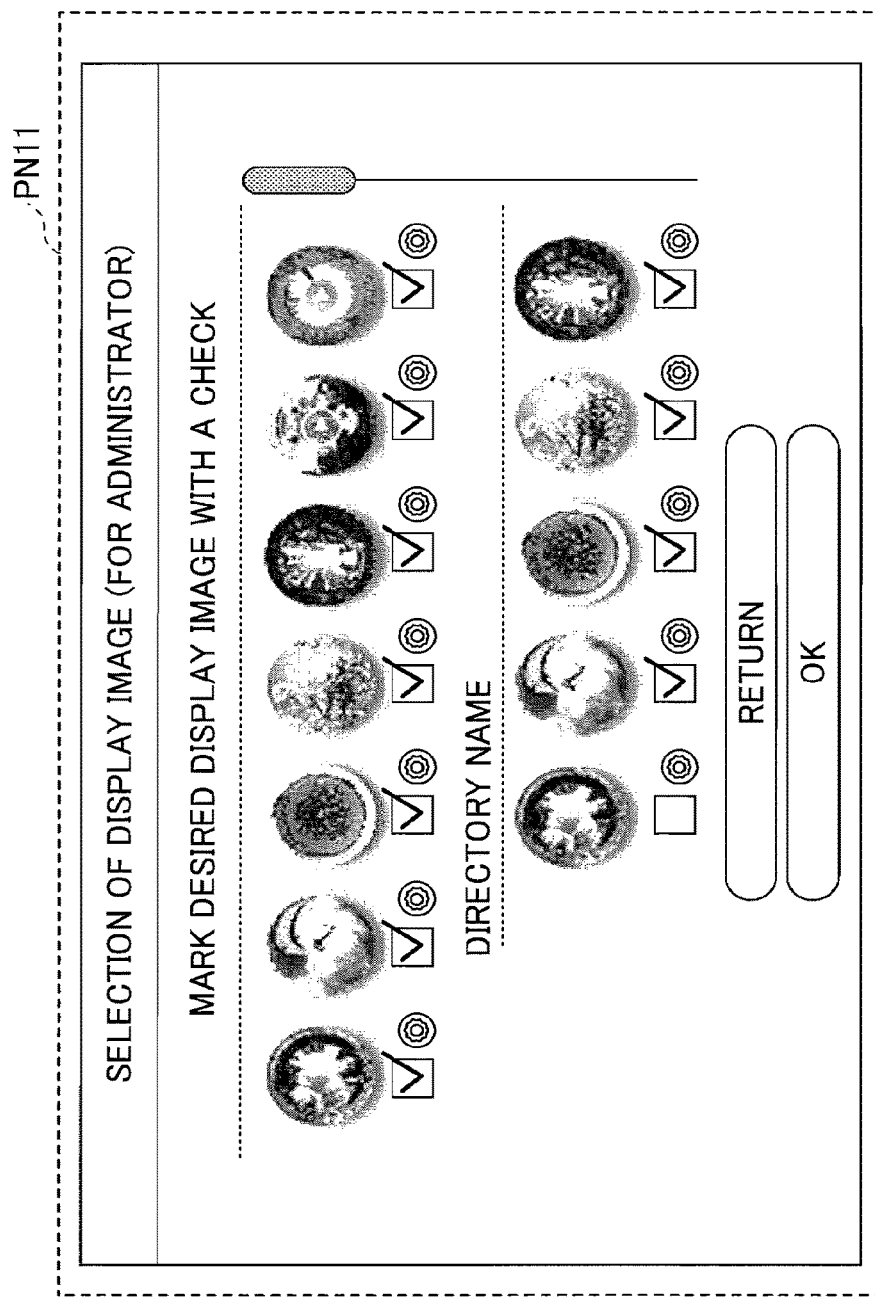
FIG. 10A and FIG. 10B are diagrams illustrating other examples of the operation screens used to input the parameters.
Figure 10B:
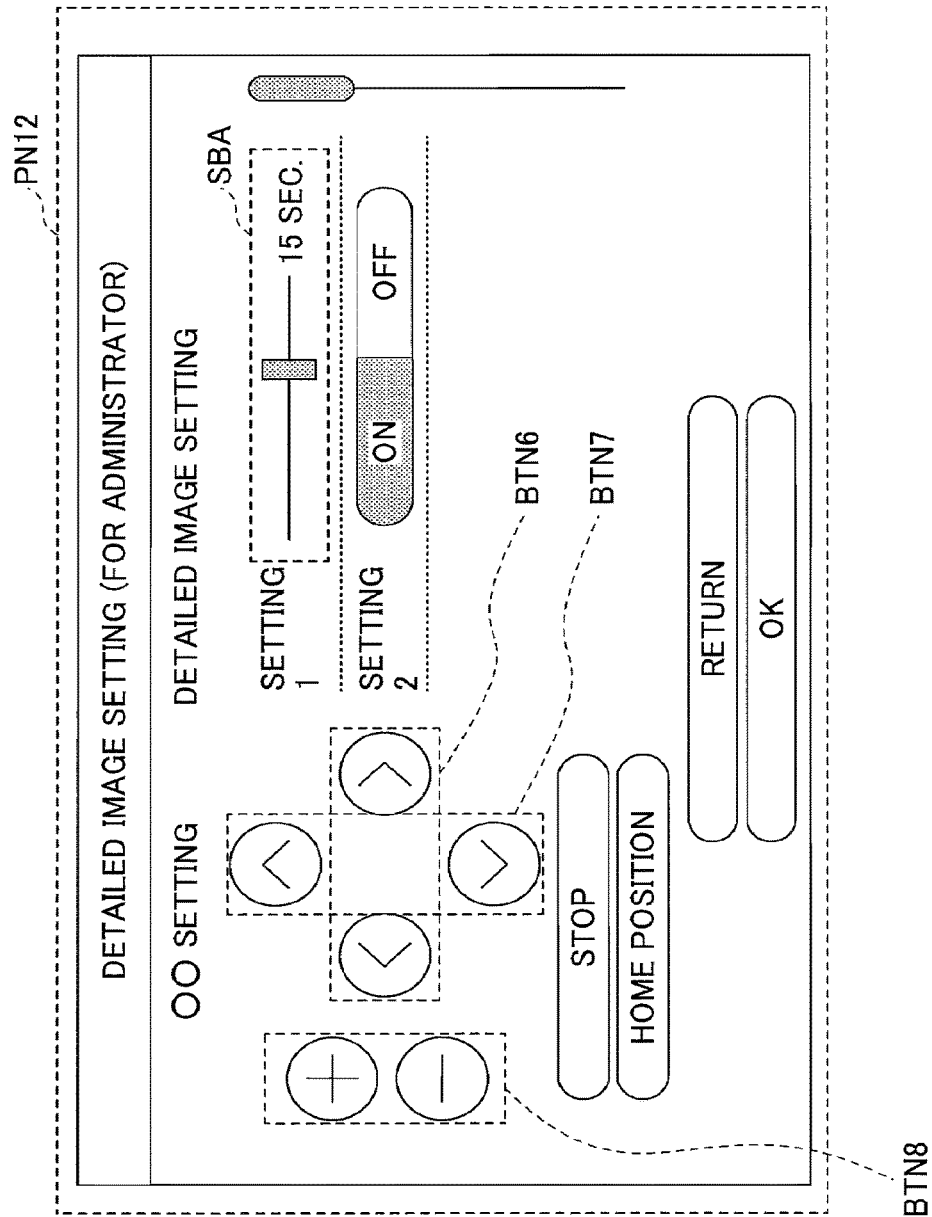

FIG. 10A and FIG. 10B illustrate other examples of the operation screens used to input the parameters. As illustrated in FIG. 10A, an eleventh operation screen PN11 is an example of an operation screen used to input the image data name parameters, and the image data name parameters indicate several image data items one of which is sequentially switched to a following image data item at intervals of a predetermined time. Namely, one of several display images indicated by corresponding image data items, boxes of which are checked in the eleventh operation screen PN11, is switched to a following display image at intervals of the predetermined time and the following display image is sequentially displayed. Further, when the several display images are selected in the eleventh operation screen PN11, the tablet 4 displays a twelfth operation screen PN12 illustrated in FIG. 10B.

The twelfth operation screen PN12 is an operation screen used to input the horizontal direction parameter, the horizontal rotation speed parameter, the vertical direction parameter, and the vertical rotation speed parameter. For example, the horizontal direction parameter is input using horizontal direction setup buttons BTN6 included in the twelfth operation screen PN12, and the vertical direction parameter is input using vertical direction setup buttons BTN7 included in the twelfth operation screen PN12. Further, the horizontal rotation speed parameter and the vertical rotation speed parameter are input using rotational speed setup buttons BTN8 included in the twelfth operation screen PN12. Further, the setting value for the predetermined time of the interval at which the image data is switched is input using a scroll bar SBA included in the twelfth operation screen PN12.

Furthermore, all the parameters with the above-described parameters may be listed in Table 1 below. In the following, a list of data items including the parameters listed in the Table 1 below will be called a play list. Note that the play list is not required to include all the parameters listed in the Table 1 below, and some of the parameters listed in the Table 1 below may be omitted from the play list. When some of the parameters are omitted, predetermined initial values may be used to set up for such parameters. Further, repeated reproduction in which several display images are switched at intervals of the predetermined time may be set up.

In addition, each of the parameters may be set up for each of the display images, and each of the parameters may be uniformly set up for all or several of the display images. Note that when the display images are motion pictures, the playback time is set up for each of the display images and each of the parameters may be set up based on the playback time.

Further, the method of inputting the parameters is not restricted to the inputting of the parameters using the GUIs. The parameters may be input using commands, text, numerical values, data, or a combination thereof. Note that an operation screen to set up the switching condition may be provided. Namely, the switching condition may be set up using the operation screen.

TABLE 1

| NO. | PARAMETER NAME | SETTING ITEM | DETAILS |
| --- | --- | --- | --- |
| 1 | version | version of format | 1.0.0. etc. |
| 2 | order | order of display images | 0: designated<br>1: random |
| 3 | contents_list | arrangement of display image settings displayed in order of storage (in case of order: 0) | |
| 4 | time | period of time for changing display image | |
| 5 | effect | effect at a time of changing display image | 0: fade-in<br>1: push to left<br>2: push to right<br>3: wipe to left<br>4: wipe to right<br>5: none<br>6: random |
| 6 | path | storage destination of display image path extension indicates playback format | |
| 7 | rotation_x | rotational angle of horizontal direction of display image | initial value (0 to 359) absolute value of angle for image after zenith correction |
| 8 | rotation_y | rotational angle of vertical direction of display image | initial value (0 to 359) absolute value of angle for image after zenith correction |
| 9 | angle | scaling ratio of display image | initial value of angle of view (10 to 100) angle of view decreases with its absolute value |
| 10 | auto_rotation_x | orientation of rotation of horizontal direction of display image | initial value of orientation of automatic rotation of horizontal direction<br>no rotation: none<br>rightward rotation: right<br>leftward rotation: left |
| 11 | auto_rotation_y | orientation of rotation of vertical direction of display image | initial value of orientation of automatic rotation of vertical direction<br>no rotation: none<br>upward rotation: up<br>downward rotation: down |
| 12 | lightness | lightness | 0 to 100 absolute value 0 is the lowest |
| 13 | contrast | contrast | 0 to 100 absolute value 0 is the lowest |

In the Table 1 above, the parameter indicated by "No. 1" is an example of a parameter indicating version information.

In the Table 1 above, the parameter indicated by "No. 2" is an example of a parameter to designate the order of images being displayed as display images. Specifically, when several images are selected as illustrated in FIG. 10A (or when the boxes of the several images in FIG. 10A are checked), the parameter indicated by "No. 2" designates the order of the selected images being displayed.

In the Table 1 above, the parameter indicated by "No. 3" is an example of a contents-list parameter to designate an arrangement of display image settings.

In the Table 1 above, the parameter indicated by "No. 4" is an example of the time parameter to designate the predetermined time of the interval for switching the display images.

In the Table 1 above, the parameter indicated by "No. 5" is an example of the effect parameter to designate the effect at the time of switching the display images. Specifically, the effect parameter is set to one of the values "0" through "6". For example, if the effect parameter is set to "0", a fade-in effect is set up at a time of changing the current image to the following image. For example, the fade-in effect may be an effect in which the currently displayed image is darkened gradually to an invisible level, or an effect in which the following image is brightened gradually, or a combination of the two effects.

Further, if the effect parameter is set to "1" or "2", a push effect is set up in which the currently displayed image is changed to the following image in a manner that the currently displayed image is pushed out. Note that a left or right direction in which the image is pushed out by the push effect is designated by setting the effect parameter to "1" or "2".

Further, if the effect parameter is set to "3" or "4", a wipe effect is set up in which the currently displayed image is gradually replaced with the following image. Note that a left or right direction in which the image is replaced by the wipe effect is designated by setting the effect parameter to "3" or "4".

In the Table 1 above, the parameter indicated by "No. 6" denotes a storage destination of image data. The storage destination is expressed by a path.

In the Table 1 above, the parameter indicated by "No. 7" is an example of a horizontal position parameter which sets up a horizontal direction angle and designates a horizontal position of an area in which a display image is displayed.

In the Table 1 above, the parameter indicated by "No. 8" is an example of a vertical position parameter which sets up a vertical direction angle and designates a vertical position of an area in which a display image is displayed.

In the Table 1 above, the parameter indicated by "No. 9" is an example of a field angle parameter which designates a range in which a display image is displayed by setting up an enlargement or reduction (scaling) rate of the display image.

Namely, when each of the parameters "No. 7" through "No. 9" is input, the area in which the display image is first displayed is designated.

In the Table 1 above, the parameter indicated by "No. 10" is an example of a horizontal direction parameter indicating an orientation of horizontal directions in which a display image is rotated in the horizontal direction.

In the Table 1 above, the parameter indicated by "No. 11" is an example of a vertical direction parameter indicating an orientation of vertical directions in which a display image is rotated in the vertical direction.

In the Table 1 above, the parameter indicated by "No. 12" is an example of the brightness parameter which sets up a brightness of a display image.

In the Table 1 above, the parameter indicated by "No. 13" is an example of the contrast parameter which sets up a contrast of a display image.

Note that the parameters may include a switching condition parameter to set up the switching condition. Note that the parameters may further include a vertical rotation speed parameter indicating a speed of rotation in a vertical direction, and a horizontal rotation speed parameter indicating a speed of rotation in a horizontal direction.

Further, the switching condition is not restricted to a switching condition related to the horizontal direction. For example, the switching condition may be a switching condition related to the vertical direction. Moreover, the switching condition may be a combination of the switching condition related to the vertical direction and the switching condition related to the horizontal direction.

If a user inputs to the tablet 4 the parameters as illustrated in the Table 1 above using the operation screens illustrated in FIGS. 8A through 10B, the tablet 4 transmits a play list to the PC 11 (FIG. 1). Namely, the step S03 of the overall process of FIG. 6 is implemented by the user's operation to the operation screens illustrated in FIGS. 8A through 10B, and the transmission of the play list to the PC 11.

Figure 11:
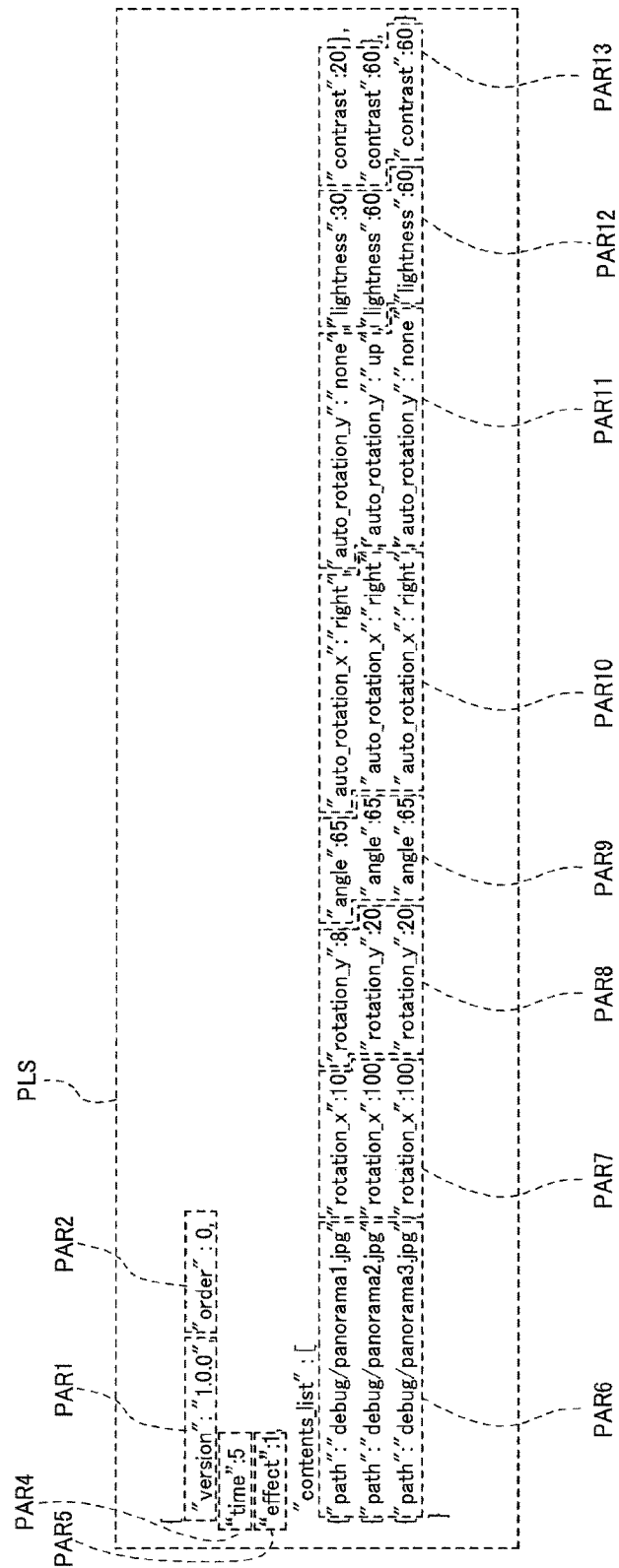
FIG. 11 is a diagram illustrating an example of a play list.

FIG. 11 illustrates an example of the play list. As illustrated in FIG. 11, the play list PLS may be generated in the format of JavaScript Object Notation (JSON), for example. In the following, the example of the play list PLS which is generated in the format of JSON will be described. Note that the play list PLS may be generated in a different format.

The parameter indicated by "No. 1" in the Table 1 above is input like a first parameter "PAR1" in the play list PLS.

The parameter indicated by "No. 2" in the Table 1 above is input like a second parameter "PAR2" in the play list PLS.

The parameter indicated by "No. 4" in the Table 1 above is input like a fourth parameter "PAR4" in the play list PLS.

The parameter indicated by "No. 5" in the Table 1 above is input like a fifth parameter "PAR5" in the play list PLS.

The parameter indicated by "No. 6" in the Table 1 above is input like a sixth parameter "PAR6" in the play list PLS.

The parameter indicated by "No. 7" in the Table 1 above is input like a seventh parameter "PAR7" in the play list PLS.

The parameter indicated by "No. 8" in the Table 1 above is input like an eighth parameter "PAR8" in the play list PLS.

The parameter indicated by "No. 9" in the Table 1 above is input like a ninth parameter "PAR9" in the play list PLS.

The parameter indicated by "No. 10" in the Table 1 above is input like a tenth parameter "PAR10" in the play list PLS.

The parameter indicated by "No. 11" in the Table 1 above is input like an eleventh parameter "PAR11" in the play list PLS.

The parameter indicated by "No. 12" in the Table 1 above is input like a twelfth parameter "PAR12" in the play list PLS.

The parameter indicated by "No. 13" in the Table 1 above is input like a thirteenth parameter "PAR13" in the play list PLS.

Figure 12A:
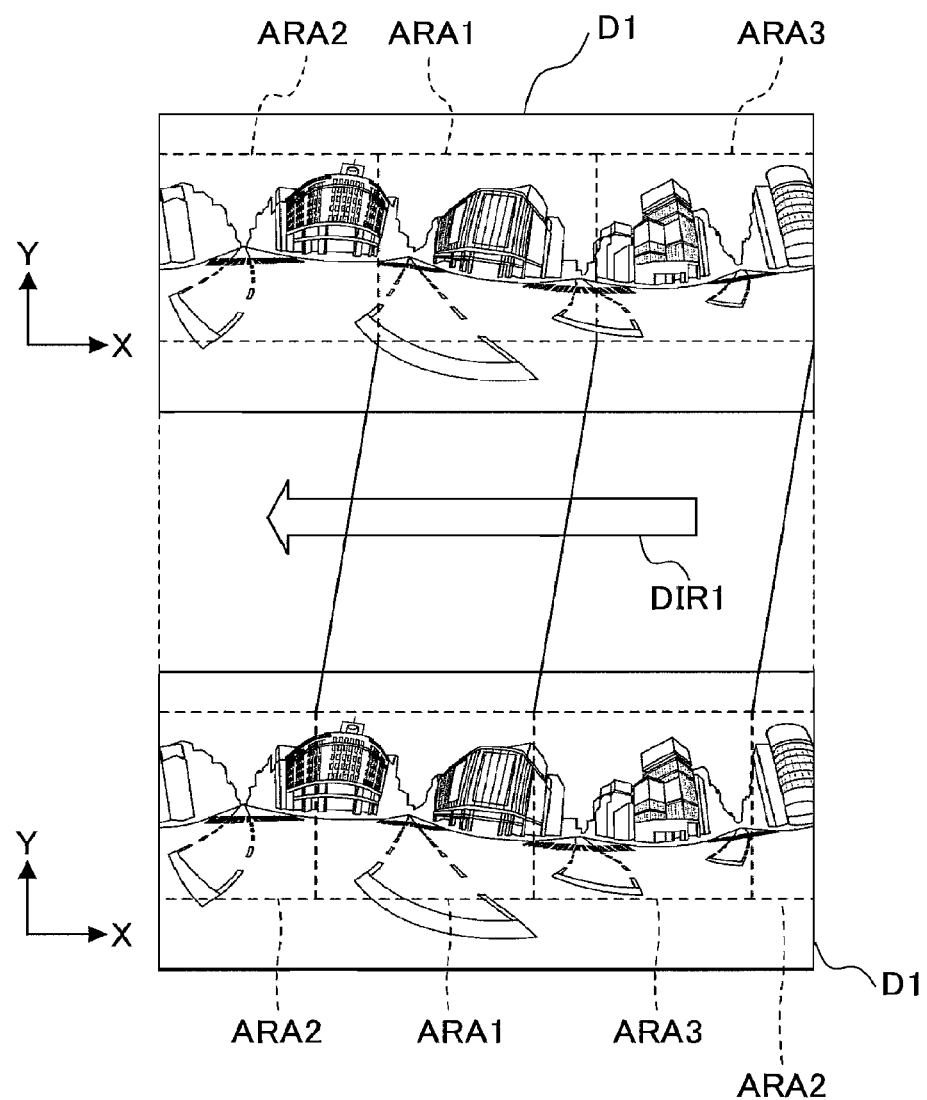
FIG. 12A and FIG. 12B are diagrams illustrating an example of a horizontal direction processing result of the overall process by the image display system according to one embodiment.
Figure 12B:
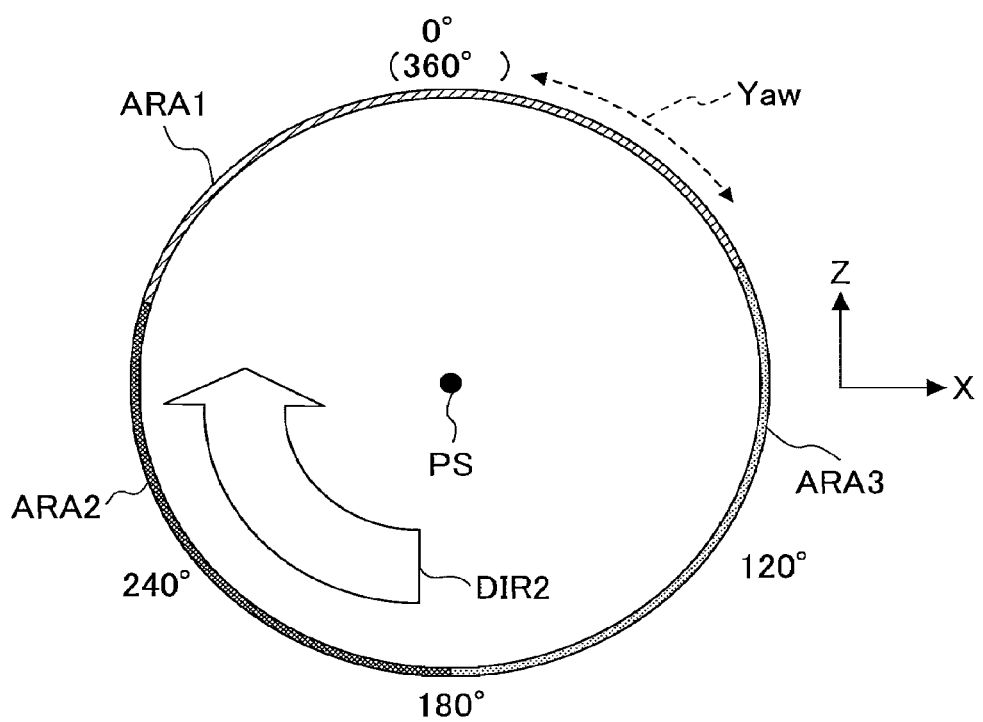

FIG. 12A and FIG. 12B illustrate an example of a horizontal direction processing result of the overall process by the image display system 1 according to one embodiment. In the following, a case in which some of areas of an image indicated by image data D1 illustrated in the upper portion of FIG. 12A are displayed as a display image will be described.

First, the horizontal direction processing will be described. When the horizontal position parameter and the field angle parameter are input by the play list PLS (FIG. 1I), the areas of the image indicated by the image data D1 in the horizontal direction, which are displayed by the projectors 1A through 1D, are determined. For example, based on the horizontal position parameter and the field angle parameter, the PC 11 determines that the third projector 1C (FIG. 1) is to display a first area ARA1 in the image indicated by the image data D1. In this case, a partial image indicating the first area ARA1 is displayed by the third projector 1C and a vertical centerline of the image is situated around the location where the Yaw angle is 0 degrees as illustrated in FIG. 12B.

Similarly, based on the horizontal position parameter and the field angle parameter, the PC 11 determines that the first projector 1A (FIG. 1) is to display a second area ARA2 in the image indicated by the image data D1. In this case, a partial image indicating the second area ARA2 is displayed by the first projector 1A and a vertical centerline of the image is situated around the location where the Yaw angle is 240 degrees as illustrated in FIG. 12B.

Further, based on the horizontal position parameter and the field angle parameter, the PC 11 determines that the fourth projector 1D (FIG. 1) is to display a third area ARA3 in the image indicated by the image data D1. In this case, a partial image indicating the third area ARA3 is displayed by the fourth projector 1D and a vertical centerline of the image is situated around the location where the Yaw angle is 120 degrees as illustrated in FIG. 12B.

The partial images indicating the first area ARA1, the second area ARA2, and the third area ARA3 based on the image data D1 are displayed by the projectors 1C, 1A, and 1D, respectively, and the image display system 1 is able to output the display image covering 360 degrees in the horizontal direction around a viewpoint PS indicated in FIG. 12B. Namely, when the horizontal position parameter and the field angle parameter are input, the image display system 1 is able to determine that the partial images of the first area ARA1, the second area ARA2, and the third area ARA3 are to be output as the display image covering 360 degrees in the horizontal direction around the viewpoint PS. Further, the display image covering 360 degrees in the horizontal direction is generated by combining the partial images of the first area ARA1, the second area ARA2, and the third area ARA3.

Here, suppose that setting to rotate the display image in a first direction DIR1 as indicated in FIG. 12A is requested by the horizontal direction parameter. In this case, the image display system 1 is configured to change the first area ARA1, the second area ARA2, and the third area ARA3 at intervals of a predetermined time. Specifically, it is assumed that the three areas are initially determined as illustrated in the upper portion of FIG. 12A, and the predetermined time has elapsed after the display image is displayed based on the determined areas. At this time, the image display system 1 changes the three areas in the first direction DIR, respectively, as illustrated in the lower portion of FIG. 12A. Then, the image display system 1 outputs a display image based on the changed areas illustrated in the lower portion of FIG. 12A.

Similar to the change illustrated in FIG. 12A, the image display system 1 repeatedly changes the three areas in the first direction DIR1 at intervals of the predetermined time. Namely, when the predetermined time has elapsed again after the display image is displayed as illustrated in the lower portion of FIG. 12A, the image display system 1 further changes the three areas illustrated in the lower portion of FIG. 12A in the first direction DIR1.

When the three areas illustrated in the upper portion of FIG. 12A are changed to the three areas illustrated in the lower portion of FIG. 12A, the images displayed by the projectors are changed so that the display image is changed. A Yaw rotation of the display image in a second direction DIR2 is viewed from the viewpoint PS as illustrated in FIG. 12B. Namely, the image display system 1 is configured to change the three areas in the first direction DIR1 at intervals of the predetermined time based on the horizontal direction parameter, to allow the rotation of the display image in the horizontal direction (the Yaw rotation).

Note that the positions of the first area ARA1, the second area ARA2, and the third area ARA3 in the horizontal direction (the X coordinates thereof) as illustrated in FIG. 12A may be designated by the horizontal position parameter, such as the parameter indicated by "No. 7" in the Table 1 above. Namely, the horizontal position parameter is a parameter to designate initial values of the X coordinates of the areas in the X axis.

Further, the range of each of the first area ARA1, the second area ARA2, and the third area ARA3 (the number of pixels or the amount of space of each area) as illustrated in FIG. 12A may be designated by the field angle parameter, such as the parameter indicated by "No. 9" in the Table 1 above. Namely, the field angle parameter is a parameter to designate the range of each area.

Further, the first direction DIR1 in which the first area ARA1, the second area ARA2, and the third area ARA3 are changed as illustrated in FIG. 12A may be designated by the horizontal direction parameter, such as the parameter indicated by "No. 10" in the Table 1 above. Note that if a horizontal direction parameter designating a horizontal direction opposite to the first direction DIR1 illustrated in FIG. 12A is input, the image display system 1 causes the rotation (the Yaw rotation) of the display image in the counterclockwise direction opposite to the second direction DIR2 illustrated in FIG. 12B.

Further, the frequency of changing the first area ARA1, the second area ARA2, and the third area ARA3 and the amount of a rotational angle or the predetermined period for changing these areas as illustrated in FIG. 12A may be designated by the horizontal rotation speed parameter. For example, a horizontal rotation speed parameter indicating 36 degrees per second may be input. In this case, the three areas are changed at intervals of one second so that the display image is rotated by the rotational angle of 36 degrees per second. After 10 seconds have elapsed, the display image is rotated by the rotational angle of 360 degrees. Namely, the display image is rotated by one revolution after 10 seconds.

Further, if a relatively great amount of the rotational angle for changing the areas in the first direction DIR1 as illustrated in FIG. 12A is input, the amount of change of each area becomes great. In this case, the Yaw rotation of the display image when viewed from the viewpoint PS illustrated in FIG. 12B takes place quickly. Hence, by inputting an appropriate horizontal rotation speed parameter, it is possible for the image display system 1 to adjust the speed of rotation (the Yaw rotation) of the display image in the horizontal direction.

Figure 13B:
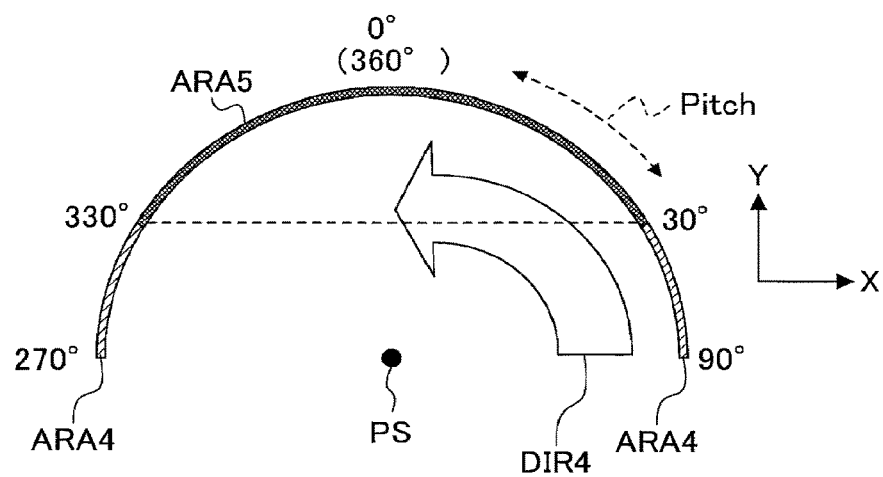

Next, a vertical direction processing result will be described. FIG. 13A and FIG. 13B illustrate an example of the vertical direction processing result of the overall process by the image display system according to one embodiment. In the following, a case in which some of areas of an image indicated by the image data D1 illustrated in the left-hand portion of FIG. 13A are displayed as a display image will be described.

If the vertical position parameter and the field angle parameter are input by the play list PLS (FIG. 11), the areas of the image indicated by the image data D1 in the vertical direction and to be displayed by the projectors 1A through 1D are determined. For example, based on the vertical position parameter and the field angle parameter, the PC 11 determines that the first projector 1A (FIG. 1), the third projector 1C (FIG. 1), and the fourth projector 1D (FIG. 1) are to display a fourth area ARA4 in the image indicated by the image data D1. In this case, a partial image indicating the fourth area ARA4 is displayed by the first projector 1A, the third projector 1C, and the fourth projector 1D and a horizontal centerline of the image is situated in the range in which the Pitch angle is "30 through 90 degrees" and "270 through 330 degrees" as illustrated in FIG. 13B.

Similarly, based on the vertical position parameter and the field angle parameter, the PC 11 determines that the second projector 1B (FIG. 1) is to display a fifth area ARA5 in the image indicated by the image data D1. In this case, a partial image indicating the fifth area ARA5 is displayed by the second projector 1B and a horizontal centerline of the image is situated in the range in which the Pitch angle is "0 through 30 degrees" and "330 through 360 degrees" as illustrated in FIG. 13B.

The partial images indicating the fourth area ARA4 and the fifth area ARA5 are displayed by the projectors 1A, 1C, 1D and the projector 1B, respectively, and it is possible for the image display system 1 to output the display image covering 180 degrees in the vertical direction from a viewpoint PS indicated in FIG. 13B. Namely, when the vertical position parameter and the field angle parameter are input, the image display system is able to determine that the partial images of the fourth area ARA4 and the fifth area ARAB are to be output as the display image covering 180 degrees in the vertical direction.

Here, suppose that setting to rotate the display image in a third direction DIR3 indicated in FIG. 13A is requested by the vertical direction parameter. In this case, the image display system is configured to change the fourth area ARA4 and the fifth area ARA5 at intervals of a predetermined time. Specifically, it is assumed that the two areas are initially determined as illustrated in the left-hand portion of FIG. 13A, and the predetermined time has elapsed after the display image is displayed based on the determined areas. At this time, the image display system 1 changes the two areas in the third direction DIR3, respectively, as illustrated in the right-hand portion of FIG. 13A. Then, the image display system 1 outputs a display image based on the changed areas as illustrated in the right-hand portion of FIG. 13A.

Similar to the change illustrated in FIG. 13A, the image display system 1 repeatedly changes the two areas in the third direction DIR3 at intervals of the predetermined time. Namely, when the predetermined time has elapsed after the display image is displayed as illustrated in the right-hand portion of FIG. 13A, the image display system 1 further changes the two areas illustrated in the right-hand portion of FIG. 13A in the third direction DIR3.

When the two areas illustrated in the left portion of FIG. 13A are changed to the areas illustrated in the right portion of FIG. 13A, the images displayed by the projectors are changed so that the display image is changed. A Pitch rotation of the display image in a fourth direction DIR4 is viewed from the viewpoint PS illustrated in FIG. 13B. Namely, the image display system 1 is configured to change the two areas in the third direction DIR3 at intervals of the predetermined time based on the vertical direction parameter, to allow the rotation of the display image in the vertical direction (the Pitch rotation).

Note that the positions of the fourth area ARA4 and the fifth area ARA5 in the vertical direction (the Y coordinates thereof) as illustrated in FIG. 13A may be designated by the vertical position parameter, such as the parameter indicated by "No. 8" in the Table 1 above. Namely, the vertical position parameter is a parameter to designate initial values of the Y coordinates of the areas in the Y-axis.

Further, the range of each of the fourth area ARA4 and the fifth area ARA5 (the number of pixels or the amount of space of each area) as illustrated in FIG. 13A may be designated by the field angle parameter, such as the parameter indicated by "No. 9" in the Table 1 above. Namely, the field angle parameter is a parameter to designate the range of each area.

Further, the third direction DIR3 in which the fourth area ARA4 and the fifth area ARA5 are changed as illustrated in FIG. 13A may be designated by the vertical direction parameter, such as the parameter indicated by "No. 11" in the Table 1 above. Note that if a vertical direction parameter designating a vertical direction opposite to the third direction DIR3 illustrated in FIG. 13A is input, the image display system 1 causes the rotation (the Pitch rotation) of the display image in the clockwise direction opposite to the fourth direction DIR4 illustrated in FIG. 13B.

Further, the frequency of changing the fourth area ARA4 and the fifth area ARA5 and the amount of the rotational angle or the predetermined period for changing these areas as illustrated in FIG. 13A may be designated by the vertical rotation speed parameter. For example, if a vertical rotation speed parameter designating a relatively great amount of the rotational angle for changing the areas in the third direction DIR3 as illustrated in FIG. 13A is input, the amount of change of each area becomes great. In this case, the Pitch rotation of the display image when viewed from the viewpoint PS illustrated in FIG. 13B takes place quickly. Hence, by inputting an appropriate vertical rotation speed parameter, it is possible for the image display system 1 to adjust the speed of rotation (the Pitch rotation) of the display image in the vertical direction.

Note that combining the horizontal direction rotation and the vertical direction rotation may allow the rotation of the display image in an oblique direction.

Figure 14A:
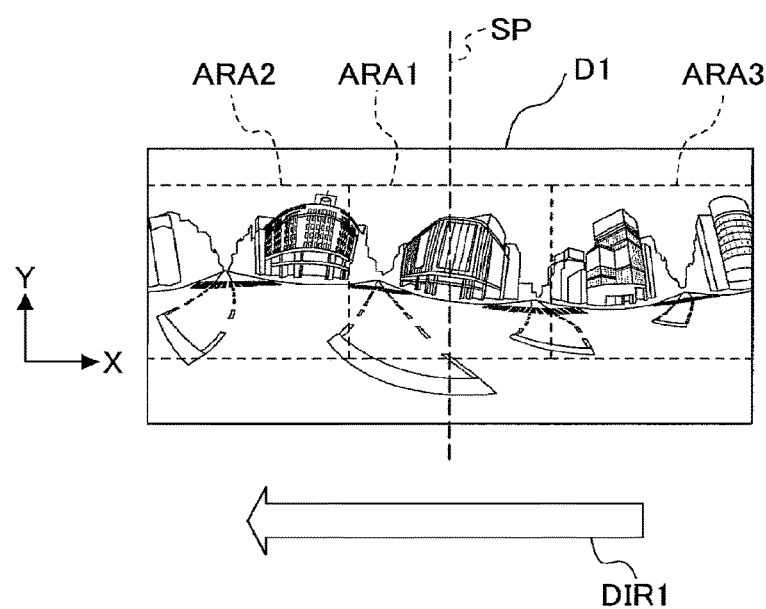

FIG. 14A and FIG. 14B illustrates an example of image switching by the image display system according to one embodiment. Suppose that setting to rotate the display image in the horizontal direction is requested and the switching condition is set to the 360-degree rotation in the horizontal direction. In the following, an example in which the image display system 1 displays the display image so that a vertical centerline of the first area ARA1 is initially situated at an initial position SP illustrated in FIG. 14A will be described. Further, suppose that, in this example, the parameters are set up similar to FIGS. 12A and 12B so that the areas are changed in the first direction DIR1.

In this case, the areas are repeatedly changed in the first direction DIR1 at intervals of the predetermined time similar to FIG. 12A. After the change of the areas is repeated to reach one revolution RT as illustrated in FIG. 14B, the centerline of the first area ARA1 is situated again at the initial position SP illustrated in FIG. 14A. At this time, the PC 11 determines that the rotation of the display image reaches 360 degrees in the horizontal direction. Namely, it is determined that the switching condition is met (or the switching condition in the overall process of FIG. 6 is met). Then, the display image is switched based on the result of the determination. It is viewed that the display image is switched when one revolution RT is reached by the Yaw rotation of the display image around the viewpoint PS as illustrated in FIG. 14B. Namely, the image display system 1 is capable of switching the display image when the display image is rotated by one revolution RT.

For example, when the horizontal rotation speed parameter designating "36 degrees per second" is input, the 360-degree Yaw rotation of the display image is viewed from the viewpoint PS after 10 seconds have elapsed. Hence, after the 360-degree Yaw rotation of the display image takes place, the display image is returned to the originally displayed image. Namely, it is viewed that the display image is rotated by one revolution.

For example, when an administrator desires to switch each display image to the following display image when the display image is rotated by one revolution, the administrator is required to calculate a switching time based on a rotational speed of the display image and set up the switching time. In many cases where the rotational speeds of respective display images are different, the calculation work of the administrator is increased and the workload of the setting by the administrator becomes heavy. On the other hand, the image display system 1 is configured to switch the image data based on the switching condition, and the image data is always switched when the switching condition is met even in the case where the rotational speeds of the display images are different. Hence, the calculation of the switching time is not needed, and the workload of the setting by the administrator can be reduced.

Figure 15:
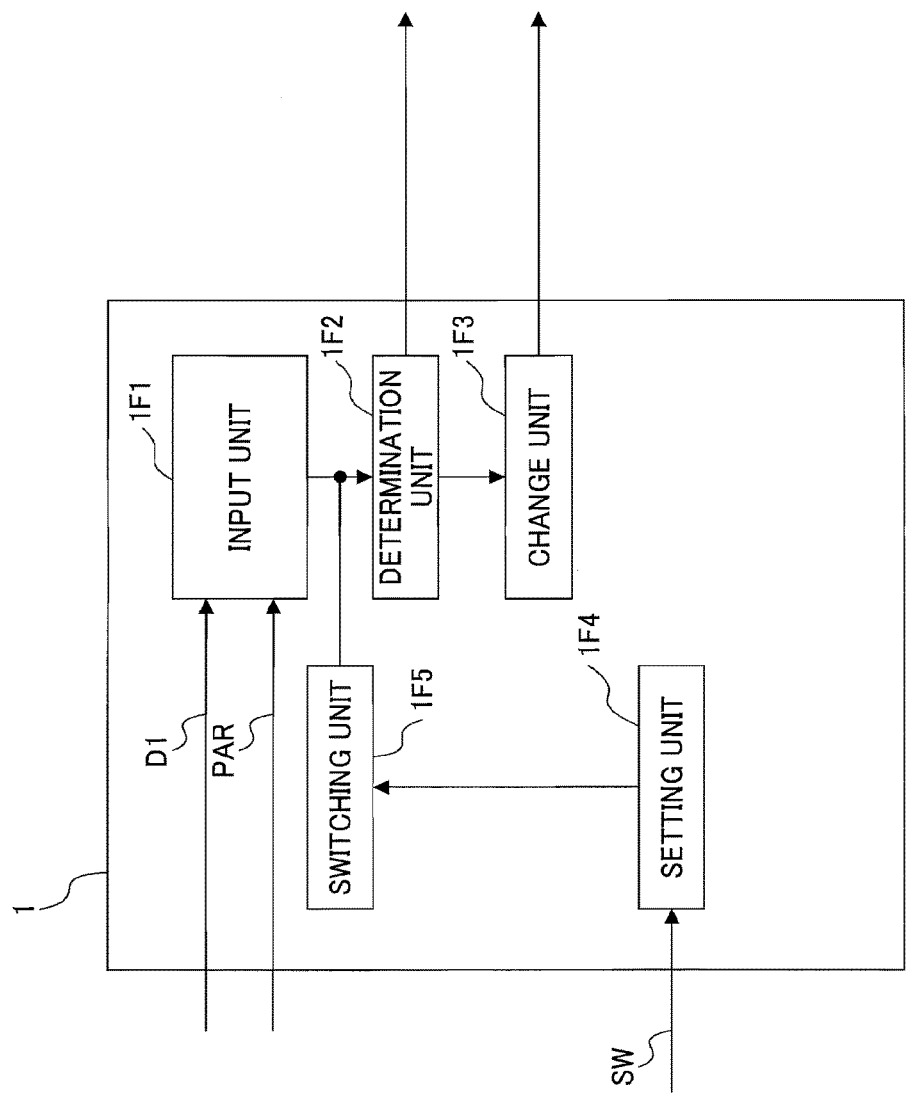
FIG. 15 is a block diagram illustrating a functional configuration of the image display system according to one embodiment.

FIG. 15 is a block diagram illustrating a functional configuration of the image display system 1 according to one embodiment. As illustrated in FIG. 15, the image display system 1 may include an input unit 1F1, a determination unit 1F2, a change unit 1F3, a setting unit 1F4, and a switching unit 1F5.

The input unit 1F1 is configured to receive the image data D1 and the parameters PAR related to a display image. Note that the input unit 1F1 may be implemented by the input interface 11H3 (FIG. 4), the input device 11H4 (FIG. 4), or the tablet 4 (FIG. 7B).

The determination unit 1F2 is configured to determine areas of an image indicated by the image data D1, which are displayed by the display devices (the projectors 1A through 1D) as partial images of the display image, based on the parameters PAR received by the input unit 1F1. Note that the determination unit 1F2 may be implemented by the CPU 11H1 (FIG. 4).

The change unit 1F3 is configured to change the areas at intervals of the predetermined time based on the parameters PAR received by the input unit 1F1, so that the display image is changed. Note that the change unit 1F3 may be implemented by the CPU 11H1 (FIG. 4).

The setting unit 1F4 is configured to set up the switching condition SW for switching the image data D1 for indicating the display mage. Note that the setting unit 1F4 may be implemented by the input interface 11H3, the input device 11H4, or the tablet 4.

The switching unit 1F5 is configured to switch the image data D1 for indicating the display mage when the switching condition SW is met according to the areas changed by the change unit 1F3. Note that the switching unit 1F5 may be implemented by the CPU 11H1.

The above units represent functions and units of the image display system 1 implemented by any of the elements and devices illustrated in FIG. 4, which are activated by instructions from the CPU 11H1 based on the programs stored in the storage device 11H2.

When the areas which are displayed by the display devices are determined based on the parameters PAR received by the input unit 1F1, the image display system 1 is able to display the display image by combining the partial images output by the display devices. The areas are determined by the determination unit 1F2 based on the parameters. Then, the change unit 1F3 changes the areas at intervals of the predetermined time based on the parameters. Similar to the examples of FIGS. 12A through 13B, when the areas are determined or changed at intervals of the predetermined time, the image display system 1 is able to display the display image at intervals of the predetermined time. Hence, the display image is output by the image display system 1 such that a rotation of the display image is viewed. The image display system is capable of switching the display image at intervals of the predetermined time based on the parameters.

When the switching condition SW set up by the setting unit 1F4 is met according to the areas changed at intervals of the predetermined time, the switching unit 1F5 switches the image data. Hence, the image data is switched when the switching condition SW is met; thereby the image display system 1 is able to switch the display image at intervals of the predetermined time based on the parameters.

Further, the direction of rotation of the display image or the rotational speed of the display image may be set up by the parameters PAR.

Note that all or some of the image display processes according to the present disclosure may be implemented by computer programs described in any of the legacy programming languages, such as Assembler, C language, and Java, object-oriented programming languages, or a combination thereof. The programs are computer programs for causing a computer, such as an information processing apparatus or an information processing apparatus included in an image display system, to execute the image display processes.

The programs may be stored in a computer-readable recording medium, such as a read-only memory (ROM) or electrically erasable programmable ROM (EEPROM), and may be distributed with the recording medium. Note that examples of the recording medium include an erasable programmable ROM (EPROM), a flash memory, a flexible disk, an optical disc, a secure digital (SD) card, and a magneto-optic (MO) disc. In addition, the programs may be distributed through an electric telecommunication line.

Further, the image display system according to the present disclosure may include a plurality of information processing apparatuses which are connected with one another via a network, and all or some of the above processes may be performed by the plurality of information processing apparatuses simultaneously, in a distributed manner, or redundantly. In addition, the above processes may be performed by a different device other than the above-described device in the image display system.

The image display system according to the present disclosure is not limited to the above-described embodiments, and variations and modifications may be made without departing from the scope of the present disclosure.

What is claimed is:

1. An image display system, comprising:
a plurality of display devices configured to display a display image; and
an information processing apparatus connected to the plurality of display devices, the information processing apparatus including processing circuitry configured to
receive a plurality of image data items and parameters related to the display image,
determine areas of partial images of the display image based on the parameters, the partial images being indicated by the image data items, so that the areas of the partial images are displayed by the display devices respectively,
set up a switching condition for switching the image data items,
switch the image data items when the switching condition is met, and
transmit data indicating the areas to the plurality of display devices, wherein the plurality of display devices are configured
to display the areas determined by the processing circuitry at intervals of a predetermined time such that a current display image is displayed, and
to display different areas based on the switched image data items when the switching condition is met such that the current display image is switched to a following display image so that the following display image is displayed,
the processing circuitry is configured to set up the switching condition based on the parameters related to the display image, and
when the switching condition is set to a 360 degree rotation in a horizontal direction and the display image is rotated 360 degrees or more in the horizontal direction, the switching condition is met and the current display image is switched to the following display image so that the following display image is displayed.

2. An information processing apparatus connected to a plurality of display devices which display a display image, the information processing apparatus comprising:
processing circuitry configured to
receive a plurality of image data items and parameters related to the display image,
determine areas of partial images of the display image based on the parameters, the partial images being indicated by the image data items, so that the areas of the partial images are displayed on the display devices respectively,
set up a switching condition for switching the image data items, and
switch the image data items when the switching condition is met, wherein the plurality of display devices are configured
to display the areas determined by the processing circuitry at intervals of a predetermined time such that a current display image is displayed, and
to display different areas based on the switched image data items when the switching condition is met such that the current display image is switched to a following display image so that the following display image is displayed, the processing circuitry is configured to set up the switching condition based on the parameters related to the display image, and when the switching condition is set to a 360 degree rotation in a horizontal direction and the display image is rotated 360 degrees or more in the horizontal direction, the switching condition is met and the current display image is switched to the following display image so that the following display image is displayed.

3. The information processing apparatus according to claim 2, wherein the processing circuitry is further configured to change the areas at intervals of the predetermined time based on the parameters.

4. The information processing apparatus according to claim 3, wherein the switching condition is indicated by a rotation of the display image over a predetermined rotational angle according to the changed areas.

5. The information processing apparatus according to claim 4, wherein when the areas are changed by the processing circuitry to rotate the display image in a horizontal direction, the switching condition is indicated by a 360-degree rotation of the display image in the horizontal direction.

6. The information processing apparatuses according to claim 2, wherein the image data items indicate an image with a field angle of 360 degrees in a horizontal direction.

7. The information processing apparatus according to claim 2, wherein the parameters include
a horizontal position parameter to designate horizontal positions of the areas,
a vertical position parameter to designate vertical positions of the areas, and
a field angle parameter to designate a range of the areas.

8. The information processing apparatus according to claim 3, wherein the parameters include any of a horizontal direction parameter to designate a direction of rotation of the display image in a horizontal direction, a horizontal rotation speed parameter to designate a rotational speed of the display image in the horizontal direction, a vertical direction parameter to designate a direction of rotation of the display image in a vertical direction, a vertical rotation speed parameter to designate a rotational speed of the display image in the vertical direction, and a combination of the horizontal direction parameter, the horizontal rotation speed parameter, the vertical direction parameter, and the vertical rotation speed parameter.

9. The information processing apparatus according to claim 8, wherein when the parameters include the horizontal direction parameter, the processing circuitry is configured to change the areas by a predetermined angle in a direction designated by the horizontal direction parameter at intervals of the predetermined time.

10. The information processing apparatus according to claim 8, wherein when the parameters include the horizontal rotation speed parameter, the processing circuitry is configured to change the areas by a rotational angle in the horizontal direction, based on the horizontal rotation speed parameter, at intervals of the predetermined time.

11. The information processing apparatus according to claim 2, wherein the display image is displayed on an object having a hemispherical shape.

12. An image display method performed by an image display system which includes a plurality of display devices configured to display a display image and an information processing apparatus connected to the plurality of display devices, the image display method comprising:

receiving a plurality of image data items and parameters related to the display image;

determining areas of partial images of the display image based on the parameters, the partial images being indicated by the image data items, so that the areas of the partial images are displayed by the display devices respectively;

setting up a switching condition for switching the image data items; and switching the image data items when the switching condition is met, wherein the plurality of display devices are configured
to display the areas determined by the processing circuitry at intervals of a predetermined time such that a current display image is displayed, and
to display different areas based on the switched image data items when the switching condition is met such that the current display image is switched to a following display image so that the following display image is displayed, the switching condition is set up based on the parameters related to the display image, and when the switching condition is set to a 360 degree rotation in a horizontal direction and the display image is rotated 360 degrees or more in the horizontal direction, the switching condition is met and the current display image is switched to the following display image so that the following display image is displayed.

13. The image display method according to claim 12, further comprising changing the areas at intervals of the predetermined time based on the parameters.

14. The image display method according to claim 13, wherein the switching condition is indicated by a rotation of the display image over a predetermined rotational angle according to the changed areas.

15. The image display method according to claim 14, wherein when the areas are changed to rotate the display image in a horizontal direction, the switching condition is indicated by a 360-degree rotation of the display image in the horizontal direction.

16. The image display method according to claim 12, wherein the image data items indicate an image with a field angle of 360 degrees in a horizontal direction.

17. The image display method according to claim 12, wherein the parameters include
a horizontal position parameter to designate horizontal positions of the areas,
a vertical position parameter to designate vertical positions of the areas, and
a field angle parameter to designate a range of the areas.

18. The image display method according to claim 13, wherein the parameters include any of a horizontal direction parameter to designate a direction of rotation of the display image in a horizontal direction, a horizontal rotation speed parameter to designate a rotational speed of the display image in the horizontal direction, a vertical direction parameter to designate a direction of rotation of the display image in a vertical direction, a vertical rotation speed parameter to designate a rotational speed of the display image in the vertical direction, and a combination of the horizontal direction parameter, the horizontal rotation speed parameter, the vertical direction parameter, and the vertical rotation speed parameter.

19. The image display method according to claim 18, wherein when the parameters include the horizontal direction parameter, the changing includes changing the areas by a predetermined angle in a direction designated by the horizontal direction parameter at intervals of the predetermined time.

20. The image display method according to claim 18, wherein when the parameters include the horizontal rotation speed parameter, the changing includes changing the areas by a rotational angle in the horizontal direction, based on the horizontal rotation speed parameter, at intervals of the predetermined time.

* * * * *